US010763903B2

(12) United States Patent
Tsuji et al.

(10) Patent No.: US 10,763,903 B2
(45) Date of Patent: Sep. 1, 2020

(54) WIRELESS COMMUNICATION APPARATUS, METHOD, AND STORAGE MEDIUM HAVING PROGRAM STORED THEREIN

(71) Applicant: NEC CORPORATION, Tokyo (JP)

(72) Inventors: Akira Tsuji, Tokyo (JP); Kenichi Maruhashi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/327,598

(22) PCT Filed: Aug. 23, 2017

(86) PCT No.: PCT/JP2017/030011
§ 371 (c)(1),
(2) Date: Feb. 22, 2019

(87) PCT Pub. No.: WO2018/038127
PCT Pub. Date: Mar. 1, 2018

(65) Prior Publication Data
US 2019/0190553 A1    Jun. 20, 2019

(30) Foreign Application Priority Data
Aug. 25, 2016    (JP) .................................. 2016-164748

(51) Int. Cl.
*H04B 1/00*    (2006.01)
*H04B 1/10*    (2006.01)
(Continued)

(52) U.S. Cl.
CPC ............. *H04B 1/0475* (2013.01); *H04B 1/10* (2013.01); *H04B 1/1027* (2013.01);
(Continued)

(58) Field of Classification Search
CPC .. H04B 1/0475; H04B 1/1027; H04B 17/345; H04L 1/007
See application file for complete search history.

(56) References Cited

U.S. PATENT DOCUMENTS 9,461,696 B1* 10/2016 Baker .................... H04B 1/401
2006/0159120 A1* 7/2006 Kim ...................... H04B 7/0417
370/465
2016/0242136 A1* 8/2016 Jung ................. H04W 56/0045

FOREIGN PATENT DOCUMENTS

JP    11-136284 A    5/1999
JP    2000-244464 A    9/2000
(Continued)

OTHER PUBLICATIONS

English Translation of JP 2007-158976, cited in the IDS (Year: 2007).*
(Continued)

*Primary Examiner* — David S Huang
(74) *Attorney, Agent, or Firm* — Sughrue Mion, PLLC

(57) ABSTRACT

A wireless communication apparatus is provided with: a first means for determining a noise generation interval on the basis of a noise measuring result; and a second means for determining the size of a data transmission unit that can be transmitted within the noise generation interval, and constructing said data transmission unit of said size.

17 Claims, 11 Drawing Sheets

(51) Int. Cl.
   *H04B 17/345*   (2015.01)
   *H04L 1/00*     (2006.01)
   *H04B 1/04*     (2006.01)
   *H04B 17/373*   (2015.01)
   *H04L 1/18*     (2006.01)

(52) U.S. Cl.
   CPC ......... *H04B 17/345* (2015.01); *H04B 17/373* (2015.01); *H04L 1/00* (2013.01); *H04L 1/0007* (2013.01); *H04L 1/1854* (2013.01)

(56) References Cited

FOREIGN PATENT DOCUMENTS

| | | |
|---|---|---|
| JP | 2004-064613 A | 2/2004 |
| JP | 2007-158976 A | 6/2007 |
| JP | 2011-234097 A | 11/2011 |
| JP | 2012-235523 A | 11/2012 |
| JP | 2013-005097 A | 1/2013 |
| JP | 2014-209155 A | 11/2014 |
| JP | 2016-005256 A | 1/2016 |
| WO | 2007/020944 A1 | 2/2007 |
| WO | 2015/060297 A1 | 4/2015 |

OTHER PUBLICATIONS

IoT/M2M 2016—A technology providing "uninterrupted radio" by Silex, May 11, 2016, 2 pages, <URL:http://news.mynavi.jp/articles/2016/05/11/iotm2m2016_silex/>.

International Search Report for PCT/JP2017/030011 dated Nov. 14, 2017 [PCT/ISA/210].

Written Opinion for PCT/JP2017/030011 dated Nov. 14, 2017 [PCT/ISA/237].

\* cited by examiner

WIRELESS COMMUNICATION APPARATUS, METHOD, AND STORAGE MEDIUM HAVING PROGRAM STORED THEREIN

CROSS REFERENCE TO RELATED APPLICATIONS

This application is a National Stage of International Application No. PCT/JP2017/030011, filed on Aug. 23, 2017, which claims priority from Japanese Patent Application No. 2016-164748, filed on Aug. 25, 2016, the contents of all of which are incorporated herein by reference in their entirety.

TECHNICAL FIELD

The present invention relates to a wireless communication apparatus, a wireless communication method, and a program thereof.

BACKGROUND ART

A trend of utilizing Internet of Things (abbreviated to "IoT") is appearing in various industries. For example, in the manufacturing industry, an example of providing sensors for sensing manufacturing apparatuses and workers in a plant, transmitting sensing information to a management apparatus (gateway) or the like through a local network (a wired local area network [LAN] or a wireless LAN) or the like, and performing monitoring of a state of the manufacturing apparatuses and flow line analysis of the workers is known. Further, an example of transmitting data collected at a gateway to a cloud through a wide-area network and performing analysis of the collected data on the cloud side is also known.

When various sensors and the like are installed in a plant, not only a wired network such as Ethernet (registered trademark) but also wireless networks using standards such as industrial wireless standards of Wireless Highway Addressable Remote Transducer (HART) and International Society of Automation (ISA) 100.11a, a wireless local area network (LAN) in compliant with Institute of Electrical and Electronic Engineers (IEEE) 802.11 standards, Bluetooth (registered trademark), and ZigBee are used. It is known that both of a wired network and a wireless network have advantages and disadvantages. For example, either of a wired and a wireless network is selected on the grounds of a number of sensors installed in a plant, whether or not a wired network can be physically run to the sensors, an introduction cost, and the like.

As is well known, when an interference source affecting wireless communication exists in a wireless network, communication quality is degraded. For example, in a case of a wireless LAN using a frequency in a 2.4 gigahertz (GHz) band, such as IEEE 802.11b, the frequency band is a frequency band called an Industry Science Medical (ISM) band. Accordingly, the frequency band can be used for various purposes other than wireless communication. As an example of the purposes, a home-use microwave oven uses a microwave in the 2.4 GHz band.

As interference sources affecting wireless communication, various manufacturing apparatuses are installed in a plant. For example, there is a manufacturing apparatus driven by a motor controlled by an inverter. For example, an inverter includes a converter unit converting a commercial power source (AC) into DC and an inverter unit applying variable-frequency AC voltage to a load (such as a motor) by changing an on-off frequency of a switch. Consequently, a rotational speed of a motor can be variably controlled. Noise is generated upon on-off switching of a switch in the inverter. For example, in an inverter using pulse width modulation (abbreviated to "PWM"), a PWM cycle is kept constant, and a motor is controlled by changing an on-off switching time of a switch, that is, a duty ratio. For example, the noise may reach a microwave frequency such as a 2.4 GHz band. Consequently, the noise may degrade quality of wireless communication in a manufacturing facility such as a plant, and an effect may appear as, for example, missing data (such as data sensed by a sensor).

Other interference sources include another wireless system. Wireless systems in compliant with a plurality of wireless standards as described above may be installed in a mixed manner in a plant. In general, wireless systems in compliant with a plurality of wireless standards cannot cooperatively perform wireless control. Accordingly, in each wireless system, another wireless system is mutually handled as noise. Further, even between wireless systems in compliant with the same wireless standard, another wireless system is similarly handled as noise when the systems are not cooperatively controlled. Regardless of a type of interference source, and without being limited to the types described above, an electromagnetic wave from an interference source other than a communication system of interest that may affect wireless communication in the communication system of interest is also herein referred to as "noise." Note that, since an electromagnetic wave is reflected in a closed space such as a plant, a spot susceptible to noise and a spot not susceptible to noise exist depending on a location.

A wireless LAN operates in such a way as to start communication after sensing whether an interference wave such as noise is generated or whether another communication terminal is performing communication, by use of, for example, carrier sense multiple access/collision avoidance (CSMA/CA).

Further, many technologies for avoiding noise degrading communication quality or interference from another communication traffic are proposed, regardless of a wired network or a wireless network.

PTL 1 discloses a network monitoring unit that estimates network status and a configuration that maintains voice communication by holding down an amount of data transmitted to a network by performing, based on the network status estimated by the network monitoring unit, compression of voice data, increase of a payload length of a packet for reducing a total amount of transferred data, change of a compression codec of voice data, and the like.

Further, as a configuration for avoiding an effect of electromagnetic noise and preventing degradation of communication quality, PTL 2 discloses an apparatus including a temporary storage unit that temporarily stores a packet received from a network, a monitoring unit that detects an anomaly of an Internet Protocol (IP) packet being caused by an effect of electromagnetic noise, and an estimation unit that estimates a generation pattern of electromagnetic noise. The apparatus operates in such a way as to store an IP packet received from one network (referred to as a network A) into the temporary storage unit when transmitting the IP packet to another network (referred to as a network B), estimate a timing at which electromagnetic noise is not generated, based on a generation pattern of electromagnetic noise, the generation pattern being estimated by the estimation unit, and transmit the IP packet at the timing at which electromagnetic noise is not generated.

PTL 3 discloses a system that, by use of a flag indicating that other traffic is being generated, reduces a packet size when the flag is ON.

PTL 4 discloses a wireless communication apparatus that suppresses interference with another communication and improves data transmission efficiency. In the wireless communication apparatus, a signal sensing unit senses power of a space radio wave signal at the same frequency channel as a plurality of testing packets and outputs sample data of the space radio wave signal. A calculation processing unit converts sample data into time-series sample data being data acquired by plotting the sample data on a time-series basis. When determining that a packet collision caused by interference between a plurality of testing packets and another communication exists, based on time-series sample data, a collision detection unit calculates a packet collision rate from a packet collision count and a transmission count of the plurality of testing packets. A control unit adjusts a parameter for data transmission performed by a data transmission-reception unit, based on a calculation result of the collision detection unit, and when detecting that interference exists in wireless communication, the control unit changes a channel, a packet size, and a communication route.

PTL 5 discloses a communication method of generating a packet by dividing data by a packet size related to a packet loss count and transmitting the packet to a short-distance wireless communication apparatus.

PTL 6 discloses a communication apparatus that detects noise on a transmission line by a noise detection means and performs, by a transmission control means, control in such a way that a data transmission speed of each packet is increased depending on an amount of noise on the transmission line, the noise being detected by the noise detection means. The communication apparatus includes an error detection means that detects an error rate on a transmission line and the transmission control means that performs control in such a way that an amount of data in each packet is decreased depending on an error rate on the transmission line, the error rate being detected by the error detection means.

PTL 7 discloses a transmitting terminal including a parameter calculation unit that, by use of: a characteristic that needs to be guaranteed with respect to a delay time required for a packet to reach from the transmitting terminal to a receiving terminal; and a network state (a transmission delay, a packet loss rate, a transmission bandwidth, and a packet size), determines a predetermined number of packets, the predetermined number of packets being encoded and being transmitted to the receiving terminal.

PTL 8 discloses a method including the following steps. When a packet loss above a first threshold value does not exist, a congestion avoidance algorithm increases an amount of redundancy information inserted to a transmission data stream and temporarily increases a data rate of the transmission data stream. The algorithm receives channel information including a packet loss from the network and monitors the packet loss in order to determine whether or not the network can support a higher data rate of the transmission data stream. When the packet loss stays below a second threshold value, the algorithm increases a bit rate of a media stream while maintaining a higher data rate of the transmission data stream.

NPL 1 discloses an access point including a redundancy function providing redundant communication paths with a 2.4 GHz band and a 5 GHz band by two wireless LAN modules. One wireless LAN module (wireless LAN module A) is used as a wireless access point function, and the other wireless LAN module (wireless LAN module B) is used for investigating a wireless environment. The wireless LAN module B monitors quality of every communication channel in the 2.4 GHz band and the 5 GHz band, and when communication quality of a channel used by the wireless LAN module A is degraded, the wireless LAN module B functions as a wireless access point function using a channel with higher communication quality. Subsequently, the wireless LAN module A functions for investigating the wireless environment. Consequently, high-quality wireless communication is provided.

CITATION LIST

Patent Literature

PTL 1: Japanese Unexamined Patent Application Publication No. 2016-5256

PTL 2: Japanese Unexamined Patent Application Publication No. 2011-234097

PTL 3: Japanese Unexamined Patent Application Publication No. 2014-209155

PTL 4: Japanese Unexamined Patent Application Publication No. 2013-5097

PTL 5: International Application Publication No. WO 2007/020944

PTL 6: Japanese Unexamined Patent Application Publication No. H11-136284

PTL 7: International Application Publication No. WO 2015/060297

PTL 8: Japanese Unexamined Patent Application Publication No. 2012-235523

Non Patent Literature

NPL 1: IoT/M2M 2016—A technology providing "uninterrupted radio" by Silex, [retrieved on Aug. 8, 2016], retrieved from the Internet: <URL:http://news.mynavi.jp/articles/2016/05/11/iotm2m2016_silex/>

SUMMARY OF INVENTION

Technical Problem

The following analysis is given by the present invention.

In IoT, many communication terminals such as sensors exist in a surrounding area, and an installation density of communication terminals per area is high. When the communication terminals perform communication using a wireless network, an occupancy rate of each channel is anticipated to be high.

Every channel is used by many communication terminals. For example, in the technique (redundancy technique) described in NPL 1, even when a channel to be used is attempted to be changed due to degradation of communication quality in a specific channel at a communication terminal, an occupancy rate of a channel to be changed to may be high. Accordingly, a situation that change to the channel to be changed to is not feasible and improvement of communication quality is difficult may be assumed.

Further, in an inverter performing PWM control, noise caused by switching is generated at least twice per cycle. FIG. 11A schematically illustrates a configuration of a typical single-phase full-bridge PWM inverter. In FIG. 11A, by comparing a triangular wave generated by an unillustrated triangular wave generator with a threshold voltage (threshold value) by an unillustrated voltage comparator, a control unit (CTRL) 50 generates, for example, control signals P1 and P2 as illustrated in graphs B and C in FIG. 11B. When P1 is at a High potential, P2 is set to a Low potential, and transistors Tr1 and Tr4 illustrated in FIG. 11A are turned on, and transistors Tr2 and Tr3 are turned off. When P1 is at a Low potential, P2 is set to a High potential, and the transistors Tr2 and Tr3 are turned on, and the transistors Tr1 and Tr4 are turned off. Furthermore, the transistors Tr1 to Tr4 are connected to diodes D1 to D4 in antiparallel, respectively. When the threshold voltage is a positive voltage, for example, a square-wave output voltage Vo (inter-terminal voltage of a single-phase motor) as illustrated in graph D in FIG. 11B is generated. In FIG. 11A, VE denotes direct current (DC) power source voltage acquired by converting a commercial alternating current (AC) power source into DC voltage by an unillustrated converter (AC-DC converter). Noise caused by switching is generated in synchronization with a rising edge (for example, a timing t2) and a falling edge (for example, timings t1 and t3) of the output voltage Vo, as schematically illustrated in graph E in FIG. 11B. Thus, in a single-phase inverter, noise is generated twice per cycle. When a PWM frequency is 1 kilohertz (kHz: 1 cycle=1 millisecond [msec]) and a duty ratio (an expression of a value acquired by dividing a pulse width by a pulse cycle) is 50%, a noise generation interval becomes 500 micro seconds (μsec). Furthermore, each of T1 and T2 in graph E in FIG. 11B denotes a generation interval of noise (a time interval from generation of noise to generation of next noise). Nt denotes a time interval from generation to termination of noise. In a case of a three-phase PWM inverter, for example, a generation frequency of noise with a three-phase motor as a load is three times the frequency in a single-phase PWM inverter. As described above, the noise frequency may reach a microwave frequency band such as a 2.4 GHz band.

For example, with respect to noise (radiation noise) caused by switching of an inverter, a wireless communication apparatus is required to have a communication control which causes a communication to be completed within a time interval in which the noise is not generated.

However, as illustrated in graph E in FIG. 11B, noise caused by switching of an inverter is caused by transient phenomena on a rising edge and a falling edge of a signal. Accordingly, noise may not always appear in the same frequency band.

On the other hand, in general, when data are transmitted to a network, as much data as possible are stored in one protocol data unit (abbreviated to "PDU") being a data transmission unit in a communication protocol and then transmitted. This is for reducing a total amount of transmission data. Note that a PDU is composed of a header defined by a communication protocol and a payload being a data content. A PDU in a layer 2 (for example, Ethernet [registered trademark]) in the Open Systems Interconnection (OSI) reference model is called a frame, and a PDU in a layer 3 (IP protocol) is called a packet. Note that a packet or a frame is hereinafter denoted as a packet (frame).

A header is assigned at the top of data in a packet (frame). The header stores various information items such as a source address, a destination address, and a data size of transmission data.

In many cases, a header length is a fixed length regardless of an amount of transmission data. When certain data are transmitted by small-sized packets (frames), a number of transmitted packets (frames) increases compared with a case of transmission by large-sized packets (frames), and a total amount of transmission data increases due to an increased number of transmitted headers.

Accordingly, it is desirable that data be transmitted by packets (frames) with a largest possible size (large-sized payload), in a time interval in which noise is not generated from an interference source such as an inverter.

In general, a maximum size of one packet (frame) is determined by a value of a maximum transmission unit (MTU: a maximum value of data transmittable in one data transmission) or the like. However, in general, when a packet (frame) with a size equivalent to an MTU is transmitted, time required for transmission becomes longer than an interval of noise caused by switching of an inverter described above.

For example, when a 1500-byte frame being a typical MTU size in Ethernet (registered trademark) is transmitted at a 24 megabit per second (Mbps) transmission rate in IEEE 802.11a, since 1 byte=8 bits, time required for transmission of one frame is $1500\times8 \text{ [bits]}/(24\times10^6)=0.0005$ [sec] (where ^ denotes an exponentiation operator), that is, approximately 0.5 msec or more. Note that a maximum Ethernet (registered trademark) frame has 1518 [bytes]. By removing a header [14 bytes] and a frame check sequence (FCS) [4 bytes], the resulting 1500 [bytes] is a typical MTU size in Ethernet (registered trademark).

The aforementioned time (approximately 0.5 msec) required for transmission of one frame is greater than a noise interval of the aforementioned inverter (single-phase inverter). In the case of a single-phase PWM inverter at a frequency 1 KHz illustrated in graph E in FIG. 11B, a generation interval T1 of noise caused by switching is, for example, less than or equal to 0.5 msec. In a case of a three-phase PWM inverter, noise caused by switching is generated six times in one cycle (1 msec), and a generation interval of the noise becomes, for example, less than or equal to 0.167 msec (accordingly, being of the order of 100 μsec). In this case, when a 1500-byte frame is to be transmitted at a 24 Mbps transmission speed at one time, interference by noise caused by switching of the inverter has an effect. Consequently, an error may occur in a wirelessly transmitted frame. In some cases, an uncorrectable error may occur. In this case, retransmission of the frame in error is required.

Furthermore, the aforementioned related arts (such as PTL 1, PTL 5, PTL 6, PTL 7, and PTL 8) estimate network status from reception quality of a packet and adjust a packet length, a transmission data size, and the like, but do not directly observe a cause of network quality degradation. Accordingly, the related arts cannot perform control for performing communication in the aforementioned time interval in which noise is not generated.

Further, another related art (PTL 2) transmits an IP packet at a timing when electromagnetic noise is estimated not to be generated, but does not change the packet itself. Accordingly, in a case that a packet size is large, when the packet is transmitted, other electromagnetic noise may be generated before transmission of the packet is completed, and the packet may be missed due to interference with the electromagnetic noise.

In the aforementioned three-phase PWM inverter or the like, a generation interval of noise caused by switching is, for example, of the order of 100 μsec. Accordingly, a missing packet may occur due to interference, depending on a strength of radiation noise or the like from the inverter.

Further, another related art (PTL 3) decreases a packet size when other traffic is generated, but does not adjust the packet size depending on a generation pattern of the other traffic. Accordingly, assuming that the other traffic is replaced by the aforementioned noise caused by switching of an inverter or the like, a transmitted packet may collide with the noise.

Furthermore, another related art (PTL 4) operates in such a way as to, when detecting interference in wireless communication, change a channel, a packet size, and a communication route. However, a change of a packet size in the related art does not include a change to a suitable value adjusting to interference status. In this respect, control of completing a communication in a time interval in which noise is not generated is not performed. Accordingly, it is conceivable that a collision between a packet and noise may occur. In addition, the related art requires predetermined time for transmission of a testing packet, and therefore an effect cannot be expected when a noise generation interval rapidly changes.

Accordingly, the present invention has been originated in view of the aforementioned issue, and an object of the present invention is to provide a wireless communication apparatus, a method, and a program that enable stable communication even in an environment in which noise is generated.

Solution to Problem

According to one embodiment of the present invention, a wireless communication apparatus includes: first means that determines a noise generation interval, based on a noise measurement result; and second means that determines a size of a data transmission unit transmittable within the noise generation interval, and constructs and transmits a data transmission unit with the size.

According to one embodiment of the method of the present invention, a wireless communication method includes: determining a noise generation interval, based on a noise measurement result; and determining a size of a data transmission unit transmittable within the noise generation interval, and constructing and transmitting a data transmission unit with the size.

According to one embodiment of the program of the present invention, a program causes a computer to execute: processing of determining a noise generation interval, based on a noise measurement result; and processing of determining a size of a data transmission unit transmittable within the noise generation interval, and constructing and transmitting a data transmission unit with the size.

According to one embodiment of the present invention, the aforementioned program may be stored by use of a non-transitory computer readable medium. The medium may be a magnetic recording medium (for example, a magnetic tape or a hard disk drive), a magneto-optical recording medium (for example, a magneto-optical disk), a compact disc-read only memory (CD-ROM), a compact disc-recordable (CD-R), a compact disc-rewritable (CD-R/W), a digital versatile disc-ROM (DVD-ROM), a digital versatile disc-recordable (DVD-R), a digital versatile disc-rewritable (DVD-R/W), a semiconductor memory (for example, a mask ROM, a programmable ROM [PROM], an electrically erasable and programmable ROM [EEPROM], a flash ROM, or a random access memory [RAM]), or the like.

ADVANTAGEOUS EFFECTS OF INVENTION

FIG. 10 is a diagram illustrating communication by OFDM used in IEEE 802.11a and the like.

EXAMPLE EMBODIMENT

Exemplary example embodiments of the present invention will be described with reference to drawings. Note that drawings and reference signs given to the description are given to respective components for convenience, as examples for facilitating understanding, and are not intended to limit the present invention to the illustrated modes.

Figure 1A:
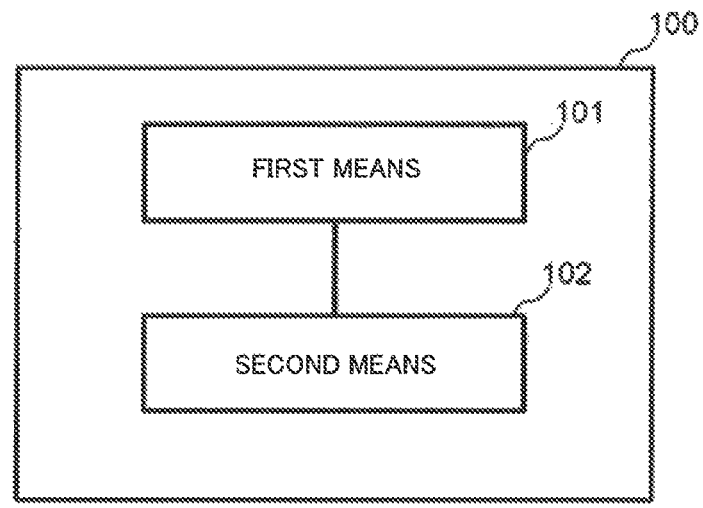
FIG. 1A is a diagram illustrating a basic embodiment of the present invention.
Figure 1B:
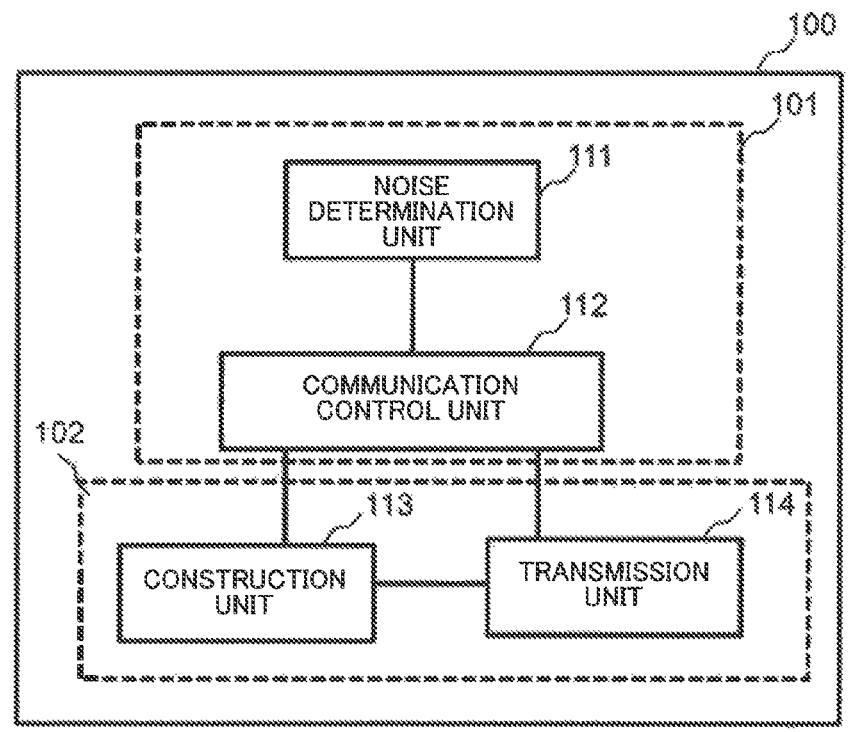
FIG. 1B is a diagram illustrating one embodiment of the present invention.

FIG. 1A is a diagram illustrating a basic embodiment of the present invention. Referring to FIGS. 1A and 1B, a wireless communication apparatus 100 includes a first means 101 that determines a noise generation interval, based on a noise measurement result, and a second means 102 that determines a size of a data transmission unit transmittable in the noise generation interval, and constructs and transmits a data transmission unit with the size. A data transmission unit here is a unit for transmitting a chunk of data, and corresponds to, for example, the aforementioned protocol data unit (for example, a frame or a packet).

For example, even in an environment in which noise is generated at shorter time intervals than the time required for transmitting a maximum size of a data transmission unit, the basic embodiment described above can be configured to set a size of a data transmission unit (frame/packet), a transmission sequence, a change of a code length of an error correction code, and the like, in such a way that the data transmission unit (frame/packet) can be transmitted at the intervals. Then, the basic embodiment enables stable communication by constructing a data transmission unit (frame/packet), based on a setting of the size and the like, and transmitting the data transmission unit in a time interval in which the noise can be avoided and communication can be performed.

FIG. 1B is a diagram illustrating a configuration of a wireless communication apparatus 100 according to one embodiment of the present invention. Referring to FIG. 1B, the wireless communication apparatus 100 includes a noise determination unit 111, a communication control unit 112, a construction unit 113 that constructs a data transmission unit, and a transmission unit 114. For example, the noise determination unit 111 and the communication control unit 112 may correspond to the first means 101 in FIG. 1A. For example, the construction unit 113 that constructs a data transmission unit and the transmission unit 114 may correspond to the second means 102 in FIG. 1A.

The noise determination unit 111 may be configured to determine noise generation information in a predetermined time range, based on a noise measurement result.

The communication control unit 112 may be configured to determine a first time interval (corresponding to a "communication-enabled time interval" according to a plurality of exemplary example embodiments to be described later) in which noise can be avoided and communication can be performed, based on noise generation information (for example, a time point when the noise is generated, a generation time interval, and a generation interval).

The construction unit 113 may be configured to determine a size of a data transmission unit whose communication can be completed within the first time interval and construct the data transmission unit by storing transmission data in the data transmission unit with the determined size. When the transmission data do not fit within the data transmission unit with the size, for example, the construction unit 113 may divide the transmission data, store the divided transmission data in a plurality of data transmission units, and transmit the stored transmission data.

The transmission unit 114 may be configured to transmit, in the first time interval, the data transmission unit constructed by the construction unit 113.

According to the one embodiment of the present invention, the noise determination unit 111 may be configured to, based on a measurement result of noise by a noise measurement unit measuring the noise, the noise being related to a frequency band used in communication, determine a time point when the noise is generated and a time interval from generation to termination of the noise, as generation information of the noise. The time point when the noise is generated may be a time (a time in the future: hours, minutes, and seconds, where seconds are specified with resolution of, for example, a millisecond or less) or may be expressed by a relative time after a certain time point (a reference time point such as a present time point).

According to the one embodiment of the present invention, the communication control unit 112 may be configured to determine the first time interval, based on a time point when the noise is generated (also referred to as a "first time point"), a time interval from generation to termination of the noise (also referred to as a "second time interval" in distinction from the first time interval, the "second time interval" corresponding to a "noise generation time interval" according to the exemplary example embodiments), and a time point when next noise is generated (also referred to as a "second time point"), and notify the first time interval of the construction unit 113.

According to the one embodiment of the present invention, the communication control unit 112 may determine a communication start time point, based on a first time point when noise is generated and the second time interval (noise generation time interval), and notify the communication start time point of the transmission unit 104. The transmission unit 114 may be configured to transmit the data transmission unit at the communication start time point. Similarly to a generation time point of noise, a communication start time point may be a time (a time in the future: hours, minutes, and seconds, where seconds are specified with resolution of, for example, a millisecond or less), or may be expressed by a relative time after a certain time point (a reference time point such as a present time point).

According to the one embodiment of the present invention, a noise measurement unit (for example, 10 in FIG. 2) that measures noise related to a frequency band used in communication may be further included.

According to the one embodiment of the present invention, the noise measurement unit (for example, 10 in FIG. 2) preferably measures noise at intervals or on a cycle shorter than generation intervals or a generation cycle of noise, respectively.

Figure 2:
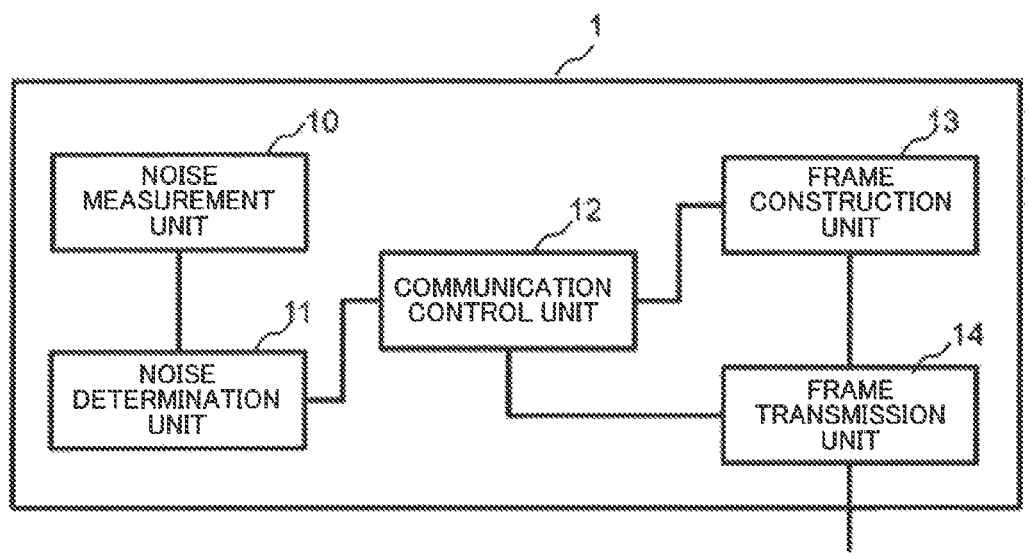
FIG. 2 is a diagram of a communication apparatus illustrating a configuration example of a first exemplary example embodiment of the present invention.

According to the one embodiment of the present invention, the noise determination unit 111 may calculate a noise generation interval (cycle), based on a first time point when the noise is generated and a second time point when next noise is generated, and set a noise measurement cycle or the like to the noise measurement unit (for example, 10 in FIG. 2).

According to the one embodiment of the present invention, the noise determination unit 111 may acquire the aforementioned noise generation interval from a noise measurement result in the noise measurement unit over a plurality of cycles, and detect a noise cycle.

Furthermore, the noise measurement unit (for example, 10 in FIG. 2) may be externally connected to the wireless communication apparatus 100. Alternatively, the noise measurement unit (for example, 10 in FIG. 2) may be removable and attachable to the wireless communication apparatus 100, either externally or internally.

Note that FIG. 1B is a diagram for illustrating functions of the basic embodiment in FIG. 1A; and it is a matter of course that the form of functional partitioning is not limited to the example in FIG. 1B. For example, the communication control unit 112 calculates a first time interval in which the noise can be avoided and communication can be performed. The communication control unit 112 may include the function of the noise determination unit 111 that determines at least a time point when the noise is generated and a time interval from generation to termination of the noise, based on a measurement result of the noise. Alternatively, the noise determination unit 111 may include the function of the noise measurement unit. Alternatively, the noise measurement unit may conversely include the function of the noise determination unit 111.

According to the one embodiment of the present invention, the noise determination unit 111 may be configured to notify at least a generation interval of the noise of the communication control unit 112; and the communication control unit 112 may be configured to determine a time interval in which noise is not generated during communication with a predetermined probability, based on a generation probability of the noise, and set the time interval as the first time interval in which communication can be performed.

According to the one embodiment of the present invention, the construction unit 113 may calculate a size of a data transmission unit transmittable during the first time interval, based on a modulation technique and a code amount of an error correction code.

According to the one embodiment of the present invention, when transmitting the data transmission unit, the transmission unit 114 may transmit a notification of transmission completion to the communication control unit 112. The communication control unit 112 may be configured to notify a next communication start time point of the transmission unit 114 and notify a next communication-enabled time interval to the construction unit 113, when receiving a notification of transmission completion from the transmission unit 114.

According to the one embodiment of the present invention, the communication control unit 112 may be configured to notify, of the transmission unit 114, communication start time points corresponding to a predetermined number of communications and notify, of the construction unit 113, a predetermined number of communication-enabled time intervals. The transmission unit 114 may be configured not to transmit a data transmission unit at the communication start time point, when receiving, from the construction unit 113, a notification of not transmitting a frame.

According to another embodiment of the present invention, the construction unit 113 may calculate a size of a data transmission unit transmittable during the first time interval, based on information about a transmission speed (rate), the information being included in a reception signal received by the wireless communication apparatus 100 from a communication counterpart, or a modulation technique and information indicating a code amount that are included in the reception signal.

Furthermore, according to the another embodiment of the present invention, at least information about a time point when the noise is generated and a time interval from generation to termination of the noise may be exchanged with another wireless communication apparatus, and the data transmission unit may be transmitted to and received from the another wireless communication apparatus in the first time interval in which the noise is not generated.

Furthermore, according to the another embodiment of the present invention, when determining a size of the data transmission unit transmittable in the communication-enabled time interval, the construction unit 113 may include a time interval until an acknowledgment from a communication counterpart is returned in the communication-enabled time interval. In this case, a waiting time until transmission may be zeroed or shortened.

Furthermore, according to the another embodiment of the present invention, the wireless communication apparatus 100 may be configured to transmit, during a time span in which the wireless communication apparatus 100 communicates with another first wireless communication apparatus, information that noise exists and communication cannot be performed with the wireless communication apparatus to another second wireless communication apparatus.

Figure 8:
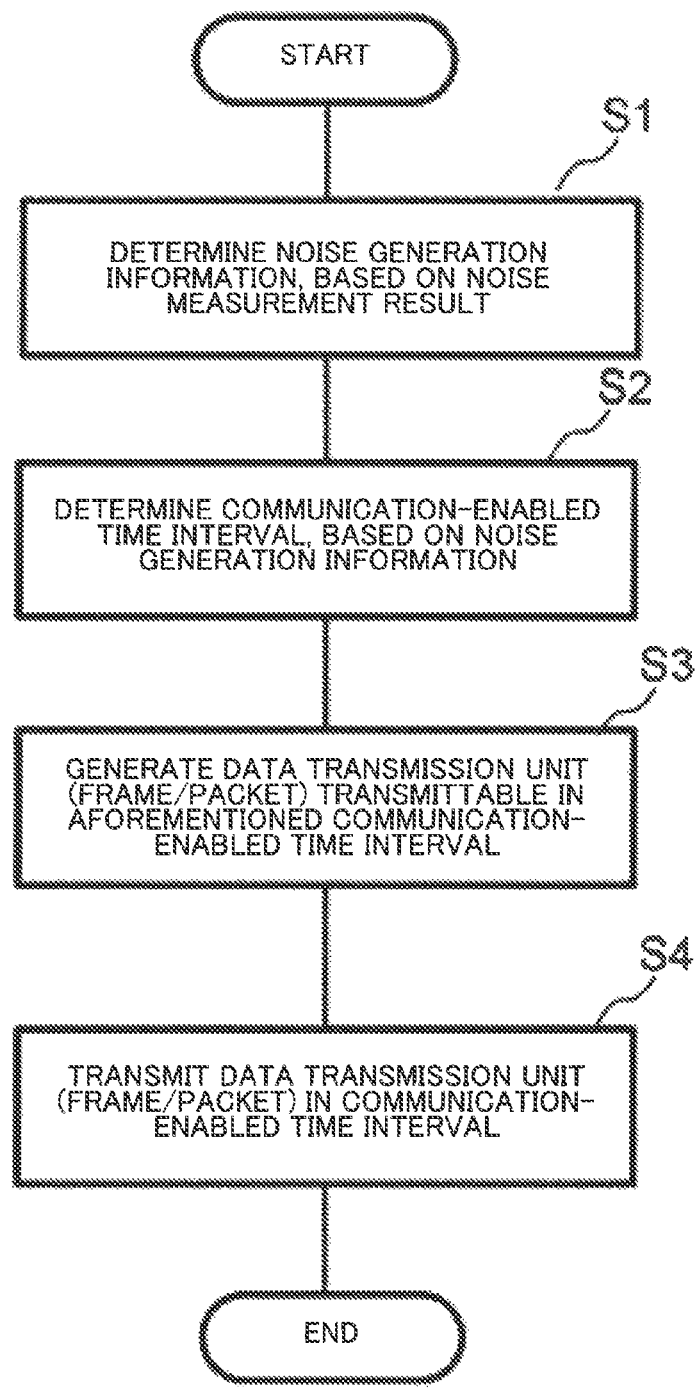
FIG. 8 is a diagram illustrating an operation of the one embodiment of the present invention.

FIG. 8 is a diagram illustrating a wireless communication control method according to the one embodiment of the present invention. The steps illustrated in FIG. 8 may be executed by, for example, the wireless communication apparatus 100 in FIG. 1A or 1B.

First, based on a noise measurement result, noise generation information in a predetermined time range is determined (Step S1)

Next, based on the noise generation information, a first time interval (communication-enabled time interval) in which noise can be avoided and communication can be performed is determined (Step S2).

Next, a size of a data transmission unit (frame/packet) transmittable within the first time interval (communication-enabled time interval) is determined, and a data transmission unit (frame/packet) with the size storing transmission data is constructed (Step S3).

Next, the data transmission unit (frame/packet) is transmitted in the first time interval (communication-enabled time interval) (Step S4).

Several exemplary example embodiments will be described below with reference to drawings. Note that examples using IEEE 802.11a as a wireless network will be described in the several exemplary example embodiments described below, for simplification of description; however, it is a matter of course that the wireless network is not limited to IEEE 802.11a.

A maximum size of a packet or a frame determined by a value of an MTU or the like is also referred to as "a maximum frame size used in a network," according to the several exemplary example embodiments. For example, according to the exemplary example embodiment, when the time required for transmitting a frame with a maximum frame size used in a wireless network is greater than a noise generation interval, communication is performed by adjusting a frame size in such a way not to receive noise interference.

First Exemplary Example Embodiment

FIG. 2 is a diagram illustrating a first exemplary example embodiment of the present invention. Referring to FIG. 2, a wireless communication apparatus 1 includes a noise measurement unit 10, a noise determination unit 11, a communication control unit 12, a frame construction unit 13, and a frame transmission unit 14. The wireless communication apparatus 1, the noise determination unit 11, the communication control unit 12, the frame construction unit 13, and the frame transmission unit 14 may be related to the wireless communication apparatus 100, the noise determination unit 111, the communication control unit 112, the construction unit 113, and the transmission unit 114 in FIG. 1B, respectively. The same holds for other exemplary example embodiments.

The noise measurement unit 10 measures radio wave status around the wireless communication apparatus 1. For example, when equipment using an inverter with PWM control at a frequency 1 kHz exists nearby, a noise generation interval is less than or equal to one cycle (=1 msec). Accordingly, a radio wave measurement cycle by the noise measurement unit 10 becomes a cycle adjusted to the noise generation interval. For example, the measurement cycle may be around 100 μsec. Measurement data related to radio wave status by the noise measurement unit 10 preferably include a power level of a radio wave received at a frequency to be measured and measurement time information. The measurement time information may include time information at or below a millisecond (for example, units of microseconds). Further, it is a matter of course that measurement time information of a power level may be time information from a certain reference time point or the like.

Measurement data measured by the noise measurement unit 10 are transferred from the noise measurement unit 10 to the noise determination unit 11. In addition, the noise measurement unit 10 may measure noise by use of an antenna (unillustrated) on the wireless communication apparatus 1 for a wireless network such as IEEE 802.11a. Alternatively, the noise measurement unit 10 may be configured to separately include a high-sensitivity antenna for measurement of noise generated from an inverter, a microwave oven, other wireless equipment, and the like, the noise being a source of interference with an IEEE 802.11a wireless network.

When measuring a power level, the noise measurement unit 10 may measure a noise component in the frequency band by, for example, a swept-tuned technique used in a spectrum analyzer or the like. Note that the swept-tuned technique measures power by configuring a local oscillator providing a local oscillation signal for a mixer in a superheterodyne receiver with a voltage controlled oscillator (VCO), sweeping a target frequency range by changing a local oscillation frequency in proportion to a ramp voltage from a sweep generator, and filtering an output of the mixer. The noise measurement unit 10 may acquire power of a frequency component to be measured, by converting a reception signal converted into a digital signal into a frequency domain by use of a fast Fourier transform (FFT), a discrete Fourier transform (DFT), or the like. In addition, the noise measurement unit 10 may be externally connected to the wireless communication apparatus 1. For example, the noise measurement unit 10 may be communicably connected to the wireless communication apparatus 1 and may be configured with, for example, a measuring instrument such as a spectrum analyzer capable of analyzing radio wave status in 2.4 GHz/5 GHz wireless bands. Alternatively, the noise measurement unit 10 may be configured with a measuring instrument such as a spectrum analyzer, and a controller being communicably connected to the measuring instrument, controlling measurement by the measuring instrument and transfer of measurement data, and being capable of communication with the wireless communication apparatus 1.

The noise determination unit 11 determines a noise generation interval from measurement data (for example, a power level and measurement time information) received from the noise measurement unit 10. Without being particularly limited, examples of the determination method of a noise generation interval (periodicity) include:

A method of using a difference (subtraction of a succeeding term from a preceding term with respect to adjacent terms) between times at each of which a value indicating a certain level of a power level is measured;

A method using autocorrelation; and

A method of converting time-domain measurement data (waveform data) into a frequency domain by an FFT, a DFT, or the like and using spectrum analysis.

Further, a technique of predicting a timing (a generation time point and a generation time interval of noise) when future noise is generated, by use of machine learning using noise measurement data from the noise measurement unit 10 as training data, or the like may be implemented on the noise determination unit 11.

From the determined noise generation interval, the noise determination unit 11 determines (predicts) information about when noise is generated, a time interval in which noise is generated, and the like within a time range (a future time range) being a predetermined time interval from the present time point.

For example, the noise determination unit 11 may pass the following information to the communication control unit 12:

A list (time-series information) of time points in which noise is generated and

A noise generation time interval (a time interval in which noise is active, that is, a time interval from a generation time point to a termination time point of noise).

The noise determination unit 11 may use, as a noise generation time interval, a list including an average value or a maximum value of noise generation time intervals as entries, based on noise measurement result data. Alternatively, when a noise generation time interval also has periodicity, the noise determination unit 11 may use a list set with a generation time interval for each noise generation event. In addition, the noise determination unit 11 may determine periodicity of a noise generation time interval by a method similar to the determination method of periodicity of noise.

The noise determination unit 11 may perform control of determining a noise generation interval in a predetermined future time range from the present time point again, based on the latest noise measurement result received from the noise measurement unit 10, at a time point before the present time point becomes a time point of, for example, the last entry in a list (a list including a noise generation time point as an entry) passed to the communication control unit 12. The noise determination unit 11 may perform control of passing a list of noise generation time points and information about noise generation time intervals to the communication control unit 12. For example, when a list of noise generation time points previously passed to the communication control unit 12 is [t1, t2, t3, . . . , tn] (n is an integer greater than or equal to 3) and, for example, the present time point corresponds to t3, the noise determination unit 11 may newly calculate future noise generation time points and a list [t4, t5, . . . , tn, tn+1, tn+2, tn+3] and pass the list to the communication control unit 12.

Alternatively, he noise determination unit 11 may be configured to determine a noise generation interval and pass a list of noise generation time points and information about noise generation time intervals to the communication control unit 12, upon occurrence of a specific event such as a change in a noise measurement result received from the noise measurement unit 10, the change being caused by appearance of a new noise source or disappearance of a noise source.

In this case, when noise status is not changed, the noise determination unit 11 may pass, to the communication control unit 12, for example, a list of noise generation time points adjusted to the present time point and information about noise generation time intervals, based on noise generation intervals calculated the previous time. Note that the noise determination unit 11 may update and set a noise measurement cycle at the noise measurement unit 10, based on the calculated noise generation intervals.

The communication control unit 12 calculates a communication-enabled time interval, based on information about a time point when noise is generated and a noise generation time interval that are received from the noise determination unit 11.

The communication control unit 12 transfers a communication-enabled time interval to the frame construction unit 13 and transfers a communication start time point to the frame transmission unit 14.

Figure 3:
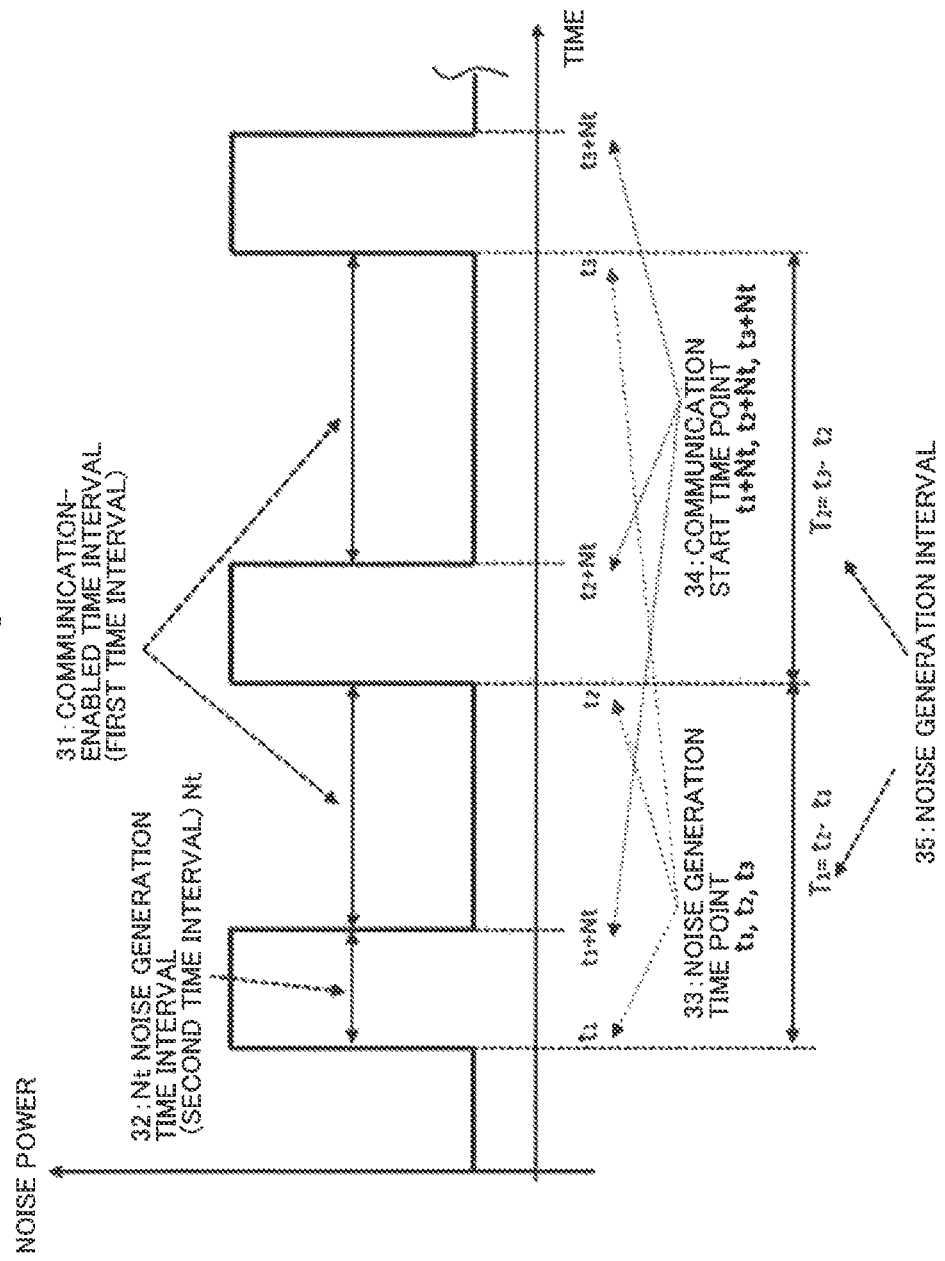
FIG. 3 is a diagram illustrating a relation between a communication start time point and a communication-enabled time interval.

FIG. 3 illustrates a relation between a communication start time point and a communication-enabled time interval that are calculated by the communication control unit 12, according to the first exemplary example embodiment. The horizontal axis in FIG. 3 represents a time and the vertical axis represents a noise power level. For example, time points t1, t2, t3, . . . , and so forth in FIG. 3 represent times within a range of a certain future time interval based on the origin. In addition, the time points t1, t2, t3, . . . , and so forth in FIG. 3 may represent times based on the origin or may represent time information (for example, set with resolution of microseconds [or 10 microseconds or 100 microseconds]). Further, in FIG. 3, it is a matter of course that a time point at the origin may be a present time point (for example, a present time) or may be a predetermined time point (a reference time point) other than a present time point.

Further, for ease of description, a power waveform of noise in FIG. 3 is represented by a binary square wave indicating existence and nonexistence of noise. When a binary signal indicating existence and nonexistence of noise is generated as illustrated in FIG. 3, for example, the binary signal indicating existence and nonexistence of noise may be generated by comparing magnitude between a measured noise power level and a predetermined threshold value by the noise measurement unit 10. Further, it is assumed in FIG. 3 that a noise generation time interval (a time interval in which noise is active) is a fixed value Nt.

How the communication control unit 12 determines a communication start time point and a communication-enabled time interval will be described below with reference to FIGS. 2 and 3.

The communication control unit 12 takes a difference (t2−t1, t3−t2, . . . ) between a generation time point 33 (t1, t2, . . . ) of certain noise (for example, referred to as "noise A") and a generation time point 33 (t2, t3, . . . ) of next noise (for example, referred to as "noise B") and acquires a noise generation interval 35 (T1=t2−t1, T2=t3−t2, . . . ).

Next, the communication control unit 12 subtracts the noise generation time interval 32 (Nt) from a noise generation interval 35 (T1=t2−t1, T2=t3−t2, . . . ) and calculates the difference as a communication-enabled time interval 31 (t2−t1−Nt, t3−t2−Nt, . . . ).

A communication start time point 34 can be determined by adding the noise generation time interval 32 (Nt) to a noise generation time point 33 (t1, t2, t3, . . . in FIG. 3). In the example in FIG. 3, communication start time points 34 become t1+Nt, t2+Nt, t3+Nt, . . . . For example, a time interval (t2−t1−Nt) from a communication start time point 34 (t1+Nt) to a next noise generation time point 33 (t2) becomes a communication-enabled time interval 31.

The communication control unit 12 notifies the calculated communication start time point 34 to the frame transmission unit 14 and notifies the communication-enabled time interval 31 to the frame construction unit 13.

Figure 10:
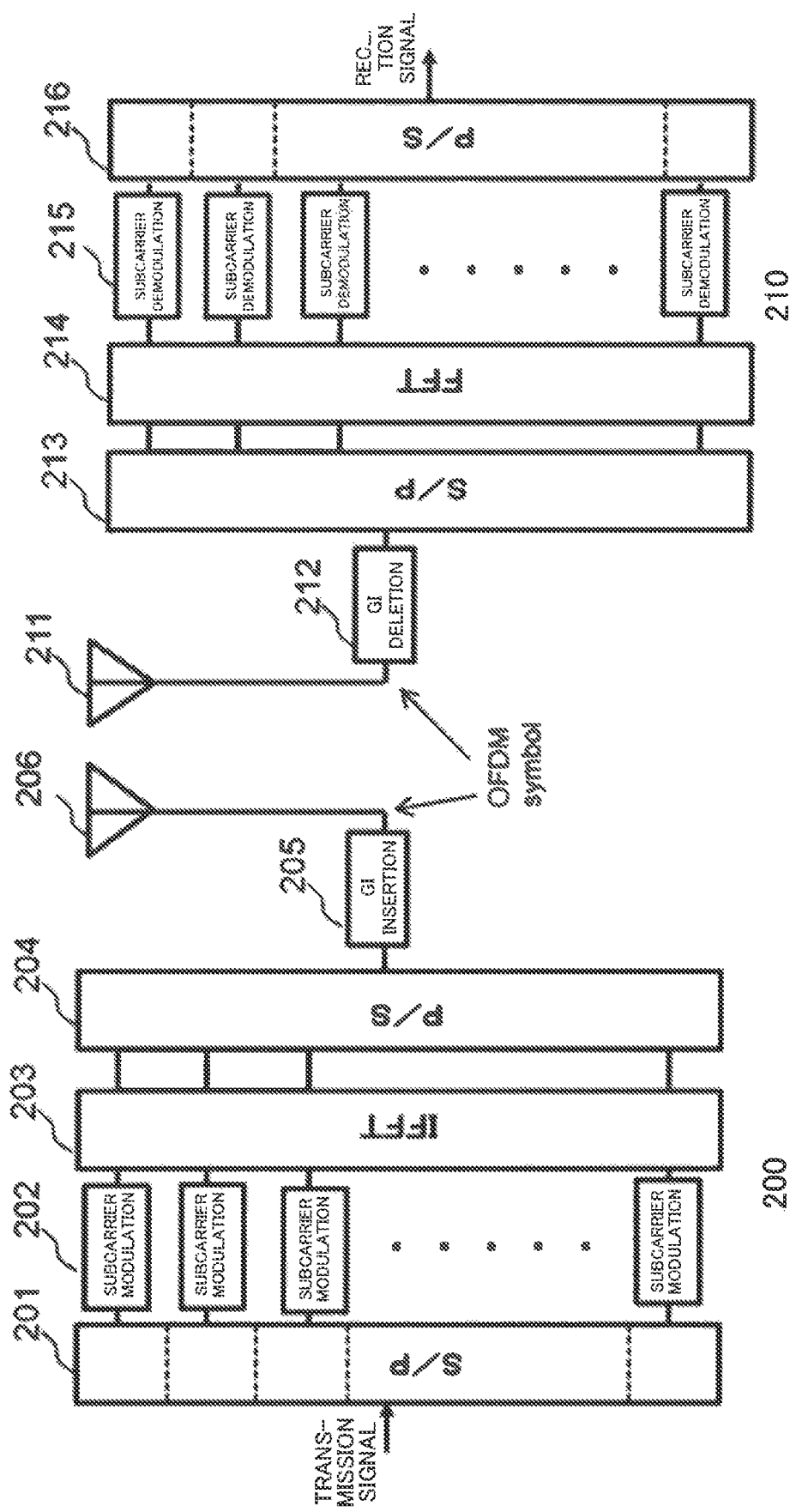
Figure 11A:
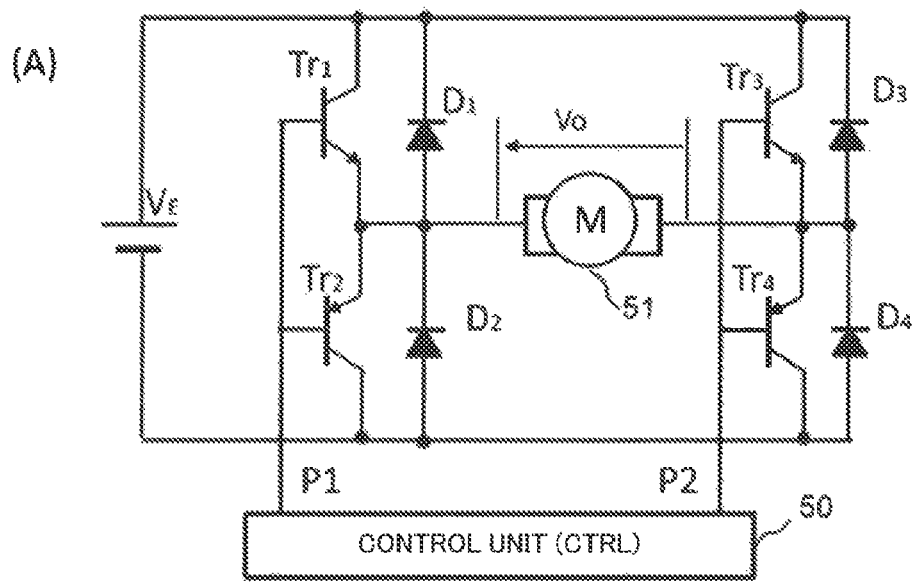
FIG. 11A is a diagram illustrating a configuration of an inverter.
Figure 11B:
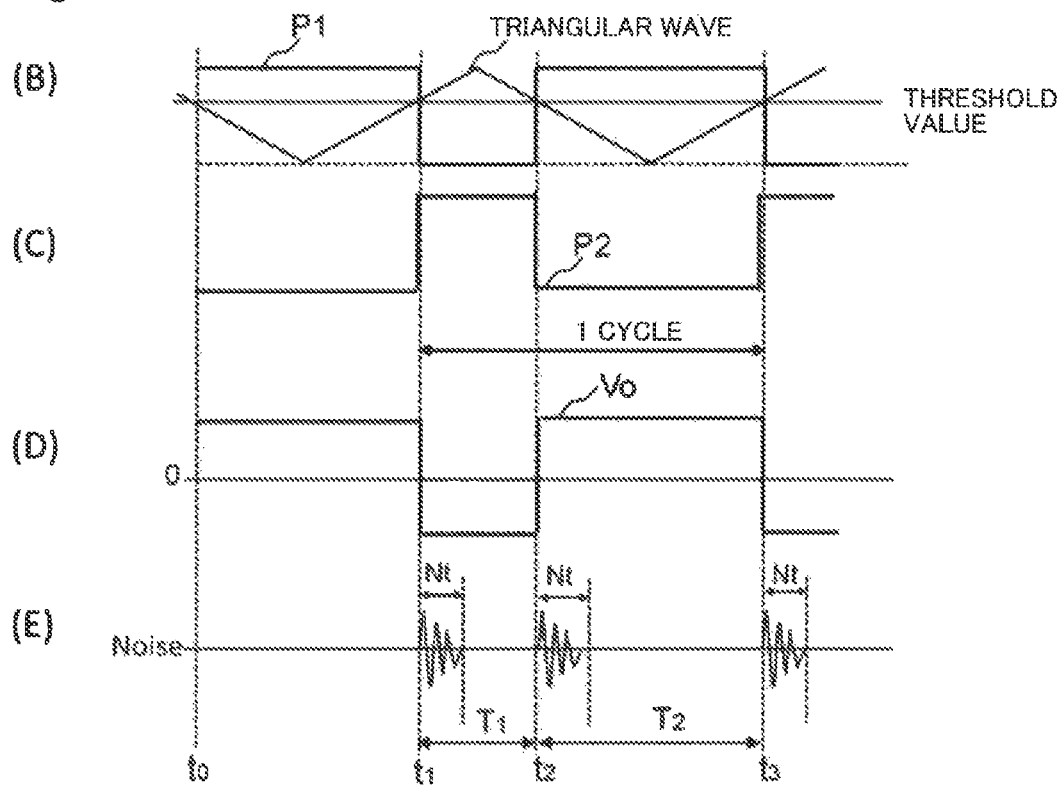
FIG. 11B is a diagram illustrating noise caused by switching.

Triggered by notification of a communication-enabled time interval 31 from the communication control unit 12, the frame construction unit 13 calculates a size of a frame (a frame length) whose transmission can be completed within the communication-enabled time interval 31. The frame construction unit 13 constructs the frame by storing transmission data into a payload of a frame with the size. The frame construction unit 13 transfers the constructed frame to the frame transmission unit 14. Further, transfer of a frame between the frame construction unit 13 and the frame transmission unit 14 may be performed through an unillustrated memory (for example, a random access memory). The frame transmission unit 14 transmits a frame constructed by the frame construction unit 13 to a wireless network through an unillustrated wireless communication unit (a baseband processing unit and a wireless transmission unit) and an antenna. Next, a derivation example of a size of a frame whose transmission can be completed within a communication-enabled time interval by the frame construction unit 13 in FIG. 2 will be described with, for example, IEEE 802.11a. An outline of wireless transmission and reception using orthogonal frequency-division multiplexing (OFDM) used in IEEE 802.11a will be briefly given here. As schematically illustrated in FIG. 10, data are divided into (48) orthogonal subcarriers by a serial to parallel (S/P) convertor 201 on a transmission side 200. Subcarrier modulation is performed on each piece of the divided data by each modulator 202, a plurality of subcarrier modulation signals are combined by an inverse fast Fourier transformer (IFFT) 203, and an IFFT signal is output. The IFFT signal is converted into a serial signal by a parallel to serial (P/S) converter 204. Furthermore, an OFDM symbol is generated by connecting, by a guard interval (GI) insertion unit 205, a copy of the IFFT signal corresponding to a certain time interval from the tail end to the top of the IFFT output as a guard interval. The OFDM symbol is frequency-converted into a radio frequency (RF) signal by an unillustrated RF transmission unit and is transmitted from an antenna 206. Processing reverse to that on the transmission side 200 is performed on a reception side 210. Specifically, a guard interval is deleted from a received OFDM symbol by a GI deletion unit 212, the resulting signal is parallelized by an S/P converter 213, an FFT is performed by a fast Fourier transformer (FFT) 214, and a subcarrier signals are regenerated. Then, 48 subcarrier signals are subcarrier-demodulated by 48 demodulators 215, and then are converted into serial data by a P/S converter 216.

In IEEE 802.11a, transmission data are divided into 48 subcarriers, and depending on a transmission rate, are modulated by the modulator 202 by use of of one of the following:
 binary phase shift keying (BPS K),
 quadrature phase shift keying (QPSK), and
 16-quadrature amplitude modulation (QAM)/64-QAM.
An amount of data (a number of bits) that can be carried by one subcarrier (a number of coded bits per single carrier for each spatial stream [or modulation order] [NBPSCS]) varies by a modulation technique to be used;
 for BPSK, 1 bit per subcarrier,
 for QPSK, 2 bits per subcarrier,
 for 16-QAM, 4 bits per subcarrier, and
 for 64-QAM, 6 bits per subcarrier.
A value of a transmission rate varies by radio wave status, and in many cases, is automatically selected in the physical layer.

In IEEE 802.11a, 48 subcarrier modulation signals are bundled into one OFDM symbol by an IFFT, as illustrated in FIG. 10.

One OFDM symbol stores data equivalent to 48×(an amount of data [a number of bits] that can be carried by one subcarrier).

For example, in a case of a transmission rate of 24 Mbps in IEEE 802.11a, a modulation technique employed in the modulator 202 in FIG. 10 is 16-QAM, and therefore an amount of data (a number of bits) that can be carried by one subcarrier is 4 bits.

Accordingly, one OFDM symbol stores data equivalent to 48×4=192 bits (data bits per OFDM symbol). However, in this case, half of 192 bits is a redundant code for error correction, and therefore 96 bits equivalent to half of the original data are stored, as will be described later.

Figure 4:
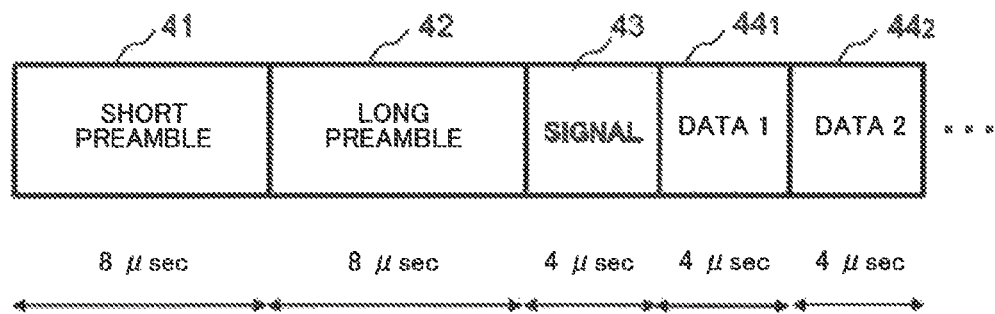
FIG. 4 is a diagram illustrating an IEEE 802.11a frame structure.

FIG. 4 illustrates an IEEE 802.11a frame structure. Referring to FIG. 4, an IEEE 802.11a frame is composed of:
 a short preamble part 41,
 a long preamble part 42,
 a SIGNAL part 43, and
 one or more data parts 441, 442, . . . (DATA 1, DATA 2, . . . in FIG. 4).
The short preamble part 41 and the long preamble part 42 constitute a physical layer convergence protocol (PLCP) preamble.

Each part in FIG. 4 is an OFDM symbol. In addition, the IEEE 802.11a specification or the like may be referred to for details of field formats of the respective parts in FIG. 4. A guard interval (GI) inserted between the respective parts is omitted in FIG. 4.

The short preamble part 41 [9 bytes] is used for timing detection and coarse adjustment of automatic frequency control (AFC).

The long preamble part 42 [18 bytes] is used for fine adjustment of the AFC and channel estimation.

The SIGNAL part 43 includes information items such as a rate (a transmission speed) [4 bits], a length (an octet length of transmission data) [12 bits], parity [1 bit], a tail [6 bits], and a service (a packet type) [16 bits].

The time required for transmission of each part is 8 μsec for the short preamble part 41 and the long preamble part 42, and 4 μsec for the SIGNAL part 43 and each data part 44.

Each data part 44 stores one OFDM symbol, and an amount of data that can be stored in an OFDM symbol varies by a modulation technique. Accordingly, a number of data parts 44 depend on the modulation technique.

For example, when a 1500-byte Ethernet (registered trademark) frame is transmitted at a transmission speed 24 Mbps in IEEE 802.11a, a modulation technique is 16-QAM, and a code rate is 1/2.

In IEEE 802.11a, transmission data are subjected to error correction coding (ECC) in order to be error-correctable in case a transmission error occurs. Redundant data are added by performing error correction coding, and therefore an amount of data increases. A code rate is a ratio (=k/n) of information bits (=k) included in a total bit length (=n) being the information bits (=k)+the redundant bits (=n−k). When a code rate is 1/2, redundant bits with the same size as original data are added. In 16-QAM, data that can be carried by one subcarrier are 4 bits. The number of symbols required for transferring a 1500-byte Ethernet (registered trademark) frame is calculated by conversion of 1 byte into 8 bits, multiplication by 2 (equivalent to division by the code rate=1/2), division by 4 bits (a number of bits that can be carried by one subcarrier when 16-QAM is used: 4 bits/symbol), and division by a number of subcarriers 48.

Consequently, 1500 [bytes]×8 [bits/bytes]÷1/2 (code rate)÷4 [bits/symbol]÷48 (number of subcarriers)=125 is acquired, and the frame is converted into 125 data symbols (OFDM symbols).

The data part 44 in FIG. 4 requires a transmission time of 4 μsec. Consequently, time 125×4 [μsec]=500 [μsec]=0.5 [msec]

is required (not including the time required for transmission of a symbol other than the data part).

Assuming transmission at 6 Mbps, a modulation technique is BPSK, and a code rate is 1/2, and therefore 500 OFDM symbols are required in the data part, as described below.

1500 [bytes]×8 [bits/bytes]÷1/2(code rate)÷1 [bit/symbol]÷48 (number of subcarriers)=500

A total transmission time becomes

500×4 [μsec]=2 [msec], which consequently gives approximately 2 msec.

Thus, in IEEE 802.11a, once a modulation technique and a code rate are given, an amount of data transmittable in a communication-enabled time can be determined.

For example, when a modulation technique and a code rate of the modulator 202 in FIG. 10 are 16-QAM and 1/2, respectively, an amount of data transmittable in a communication-enabled time of 100 μsec can be determined as follows.

(1) Time that can be allocated to transmission of the data parts=a communication-enabled time (=100 μsec)−a transmission time of the short preamble (=8 μsec)−a transmission time of the long preamble (=8 μsec)−a transmission time of the SIGNAL (=4 μsec)=80 μsec.

(2) A number of the data parts=80 [μsec] (calculated from (1) above)÷4 [μsec] (a transmission time of the data part)=20 [pieces]

(3) A transmittable data size=20 [pieces] (a number of the data parts)×192 [bits] (an amount of data per OFDM symbol)×1/2 (code rate)=1920 [bits]=240 [bytes].

The frame construction unit 13 generates an Ethernet (registered trademark) frame in such a way that a total size including the Ethernet (registered trademark) header (14 bytes) and the FCS (4 bytes) becomes 240 bytes, performs modulation and encoding in accordance with the IEEE 802.11a specifications, and constructs an IEEE 802.11a frame. The frame construction unit 13 passes the constructed IEEE 802.11a frame to the frame transmission unit 14.

A case of a number of data parts transmittable in a communication-enabled time being zero indicates that data cannot be transmitted at the communication start time point in the communication-enabled time. In this case, the frame construction unit 13 may not construct a frame. In this case, the frame construction unit 13 may notify the frame transmission unit 14 that a frame is not transmitted.

Further, in a case of a wireless network other than IEEE 802.11a, a size of a frame transmittable in a communication-enabled time interval can be similarly calculated. The reason is that the time required for transmitting a symbol and an amount of data included in a symbol are determined as a specification in each wireless communication standard.

As another configuration in IEEE 802.11a, it is conceivable that a transmission speed (rate) (=what modulation technique is used and how much a code rate is) is automatically determined in the physical layer.

A module determining a transmission speed (rate) may be configured to include an interface for acquiring information about a transmission speed in such a way that the information about the transmission speed (rate) can be acquired from outside the wireless communication apparatus 1. In this case, even when a module determining a transmission speed (rate) is implemented as a semiconductor chip, a size of a frame transmittable in a communication-enabled time interval can be calculated in a higher-level software layer. Accordingly, the first exemplary example embodiment is applicable.

Furthermore, according to the first exemplary example embodiment, a frame is transmitted at a timing when noise is not generated, and therefore radio wave status is considered to be clear. Accordingly, an operation of performing communication at a maximum transmission speed (rate) defined by each wireless communication standard is enabled.

For example, a maximum transmission speed of 54 Mbps can be used in a case of IEEE 802.11a.

When a transmission speed (rate) is uniquely determined to be a maximum transmission speed (rate) defined by a wireless communication standard, a modulation technique and the like are uniquely determined, based on the transmission speed (rate). Accordingly, an amount of data included in a symbol can be determined. Consequently, a size of a frame transmittable in a communication-enabled time interval can be calculated.

The frame transmission unit 14 transmits an IEEE 802.11a frame received from the frame construction unit 13 to a wireless network at a communication start time point (timing) received from the communication control unit 12.

When transmitting an IEEE 802.11a frame to the wireless network, the frame transmission unit 14 may return a notification of transmission completion to the communication control unit 12 as a response.

When the frame transmission unit 14 receives, from the frame construction unit 13, a notification that a frame is not transmitted, the frame transmission unit 14 may, for example, transfer a notification of transmission completion to the communication control unit 12 without transmitting a frame. Alternatively, the frame transmission unit 14 may return, to the communication control unit 12, a notification that a frame cannot be transmitted, as a response.

When receiving a notification of transmission completion from the frame transmission unit 14, the communication control unit 12 may notify a next communication start time point to the frame transmission unit 14 and notify a communication-enabled time interval to the frame construction unit 13.

Alternatively, the communication control unit 12 may notify communication start time points of a certain number of communications to the frame transmission unit 14 and notify communication-enabled time intervals of a certain number of communications to the frame construction unit 13. In this case, when receiving, from the frame construction unit 13, a notification that a frame is not transmitted, the frame transmission unit 14 does not transmit a frame at the communication start time point. In this case, the frame transmission unit 14 may return, to the communication control unit 12, a notification indicating that a frame cannot be transmitted, as a response.

The noise determination unit 11 may be configured to pass a noise generation interval (35 in FIG. 3 [T1, T2, and so forth]) along with a noise generation probability calculated by the noise determination unit 11 to the communication control unit 12.

As an example, the noise determination unit 11 may determine a generation interval of noise generated in a preset time range and, for example, notify the communication control unit 12 of noise generation probability information such as "a probability of noise being generated every 100 μsec is 60%" and "a probability of noise being generated every 50 μsec is 10%."

The communication control unit 12 may determine an expected value and a probability distribution of noise generation times and, for example, may set a time interval in which noise is not generated during communication with a probability of 90% as a communication-enabled time interval and provide a notification such as "select a frame size" for the frame construction unit 13, based on the communication-enabled time interval.

When the frame transmission unit 14 receives a generated frame from the frame construction unit 13, the frame can be transmitted to the wireless network.

Alternatively, the noise determination unit 11 may pass a noise generation interval to the communication control unit 12, and a noise generation probability described above may be determined on the communication control unit 12 side.

The first exemplary example embodiment measures a radio wave environment around a wireless communication apparatus and measures noise whose frequency components are in a communication frequency band. Then, based on the noise measurement result, noise information (for example, information items such as a noise generation time point [timing], a noise generation time interval, and a noise generation interval, or a noise generation probability in a predetermined time interval or the like) is calculated. Then, based on the aforementioned noise information (information items such as a noise generation time point, a noise generation time interval, and a noise generation interval, or a noise generation probability in a predetermined time interval or the like), the communication control unit 12 calculates a communication-enabled time interval in which communication can be performed without being affected by noise due to the time interval of no noise generation or low noise generation probability. The frame construction unit 13 calculates a size of a frame whose transmission is completed within the communication-enabled time interval and constructs a frame with the size. Then, the frame transmission unit 14 receives a communication start time point (timing information) from the communication control unit 12 and transmits the frame at the communication start time point. Consequently, the first exemplary example embodiment can transmit the frame to a communication counterpart without being affected by noise.

Thus, the first exemplary example embodiment provides a configuration that transmits a frame while adjusting a frame size (frame length) in such a way that transmission is completed within a communication-enabled time interval. Accordingly, a frame can be transmitted without being affected by noise even in an environment in which a noise interval is short. For example, stable and highly-reliable wireless communication can be provided even in an environment in which noise is generated at time intervals shorter than the time interval required for transmission of a frame with a maximum frame size used in wireless communication.

Furthermore, in general, communication overhead increases as a frame size becomes shorter, and therefore data transmission efficiency declines. The first exemplary example embodiment sets a suitable frame size in an environment in which a noise interval is short.

Second Exemplary Example Embodiment

Next, a second exemplary example embodiment of the present invention will be described. Note that a component similar to that according to the aforementioned first exemplary example embodiment is given the same sign, and detailed description is omitted.

Figure 5:
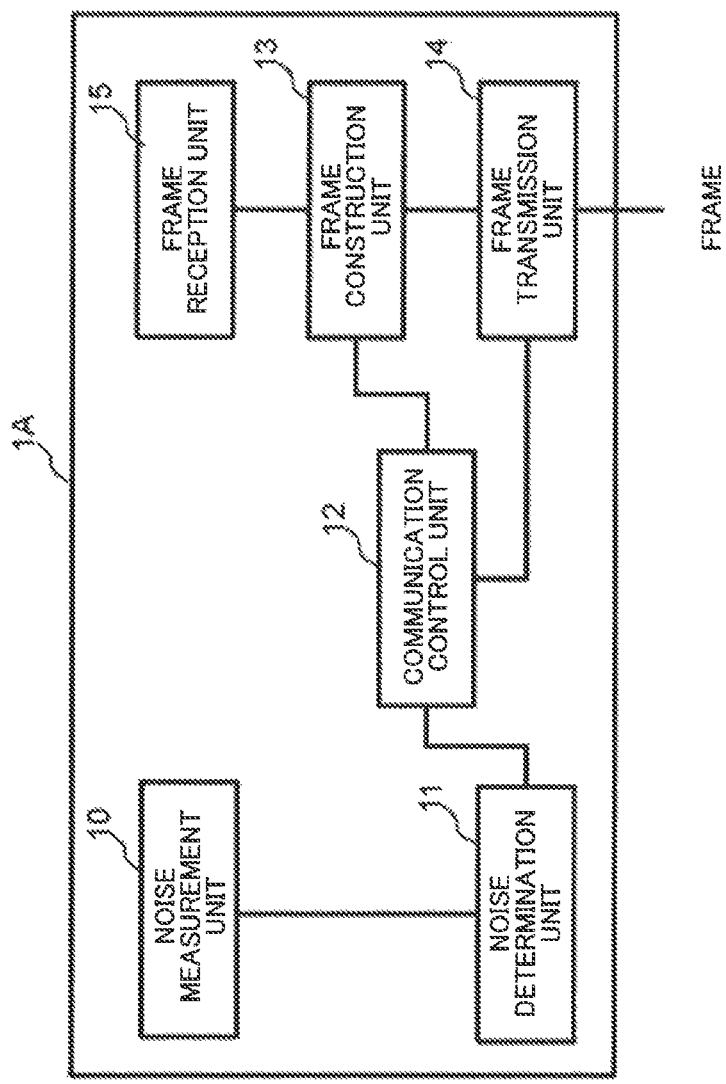
FIG. 5 is a diagram of a communication apparatus illustrating a configuration example of a second exemplary example embodiment of the present invention.

FIG. 5 is a diagram illustrating the second exemplary example embodiment of the present invention. Referring to FIG. 5, a wireless communication apparatus 1A includes a frame reception unit 15 in addition to the configuration of the wireless communication apparatus 1 in FIG. 2.

The frame reception unit 15 receives a frame from a wireless network.

In IEEE 802.11a, the SIGNAL part of a frame (43 in FIG. 4) stores information about a transmission speed (rate). Accordingly, a code rate and a modulation technique can be determined from the SIGNAL part of a received frame. Thus, information about a present transmission speed (rate) is acquired by, for example, analyzing the SIGNAL part (43 in FIG. 4) of a frame by the frame reception unit 15, the frame transmitted by the frame transmission unit 14 in a wireless communication apparatus on the transmission side being received by the frame reception unit 15 in a wireless communication apparatus on the reception side.

A transmission speed (rate) acquired by the frame reception unit 15 is passed to a frame construction unit 13. Based on the transmission speed (rate), the frame construction unit 13 calculates a size of a frame (a frame length) transmittable in a communication-enabled time interval in which noise is not generated. Then, the frame construction unit 13 constructs a frame with the size. The frame transmission unit 14 transmits the frame constructed by the frame construction unit 13, in accordance with an instruction from the communication control unit 12.

Alternatively, the frame reception unit 15 may receive a frame from a communication counterpart of the wireless communication apparatus 1A, such as an access point, and acquire information about a transmission speed (rate) from the SIGNAL part (43 in FIG. 4) of the frame.

The wireless communication apparatus 1A simply observes a radio wave environment around the wireless communication apparatus 1A. Accordingly, the wireless communication apparatus 1A does not have information about a radio wave environment around an unillustrated communication counterpart. Thus, when the radio wave environment of the communication counterpart is poor, the communication counterpart is not necessarily able to receive a frame transmitted by the wireless communication apparatus 1A.

Accordingly, the wireless communication apparatus 1A may be configured to calculate a size of a frame (that is, a size of data stored in a frame) transmittable in a communication-enabled time interval in accordance with a transmission rate determined based on information of noise measured by the communication counterpart, and construct a frame with the size.

Consequently, for example, the frame construction unit 13 may be configured with the following separate modules (neither illustrated):
  a module that determines a data size that can be stored in a frame whose transmission is completed within a communication-enabled time interval (a module that calculates a frame size whose transmission is completed within a communication-enabled time interval) and
  a module performing modulation.

In addition, the module performing modulation may be configured to be included in the frame transmission unit 14.

In this case, for example, even when the module that determines a data size available to be stored in a frame whose transmission is completed within a communication-enabled time interval cannot acquire information about a modulation technique selected by the module performing modulation directly from the module performing modulation, a frame size adjusted to noise can be selected based on a transmission speed (rate) in the SIGNAL part (43 in FIG. 4) of a received frame.

Furthermore, when a transmission speed (rate) used by the wireless communication apparatus 1A can be acquired from the frame reception unit 15 or the module that determines a transmission speed (rate), a transmission speed of a communication counterpart may be compared with the transmission speed of the wireless communication apparatus 1A, a frame size transmittable in a communication-enabled time interval may be calculated adjusting to a lower transmission speed, and then a frame may be constructed.

According to the second exemplary example embodiment, the wireless communication apparatus 1A is configured to calculate a frame size transmittable in a communication-enabled time interval by use of transmission speed (rate) information included in a received frame and construct a frame with the size. With such a configuration, in a case that the wireless communication apparatus 1A performs communication in accordance with IEEE 802.11a, and an interface for acquiring information about a transmission speed (rate) is not provided in the physical layer, or the like, the case that information about a transmission speed (rate) cannot be acquired can be handled, and communication adjusted to a radio wave environment of a communication counterpart can be provided.

Third Exemplary Example Embodiment

Figure 6:
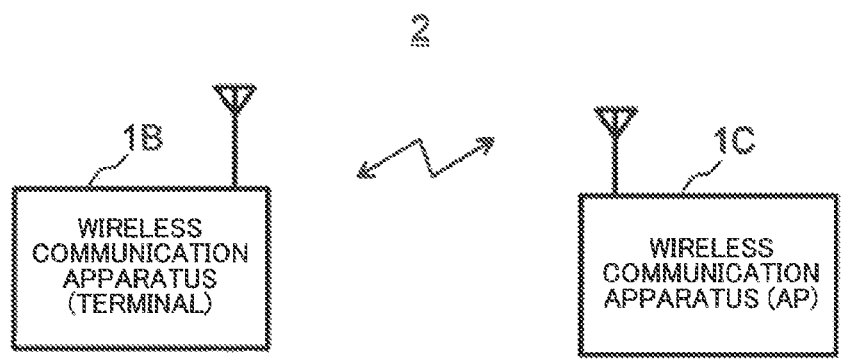
FIG. 6 is a diagram illustrating a configuration example of a third exemplary example embodiment of the present invention.

Next, a third exemplary example embodiment of the present invention will be described with reference to drawings. Note that a component similar to that according to the aforementioned first or second exemplary example embodiment is given the same sign, and detailed description is omitted. FIG. 6 illustrates a wireless communication system 2 according to the third exemplary example embodiment of the present invention. Referring to FIG. 6, the wireless communication system 2 includes two wireless communication apparatuses 1B and 1C being connected to one another through a wireless network.

It is assumed in FIG. 6 that one of the two wireless communication apparatuses 1B and 1C is a terminal, and the other is a wireless LAN access point (AP). The above is not intended to limit the present example embodiment to the mode in FIG. 6, and for example, the two wireless communication apparatuses 1B and 1C may be terminals. For example, the two wireless communication apparatuses 1B and 1C may have a function (device-to-device communication function) of performing direct communication without going through a base station in the wireless access network.

It is assumed, for example, that the wireless communication apparatuses 1B and 1C are time-synchronized by use of the Global Positioning System (GPS) or the like. Other time synchronization methods include, for example, a method using IEEE 1588 and a method defined by a wireless communication standard, such as the timing synchronization function (TSF) in IEEE 802.11.

Figure 7:
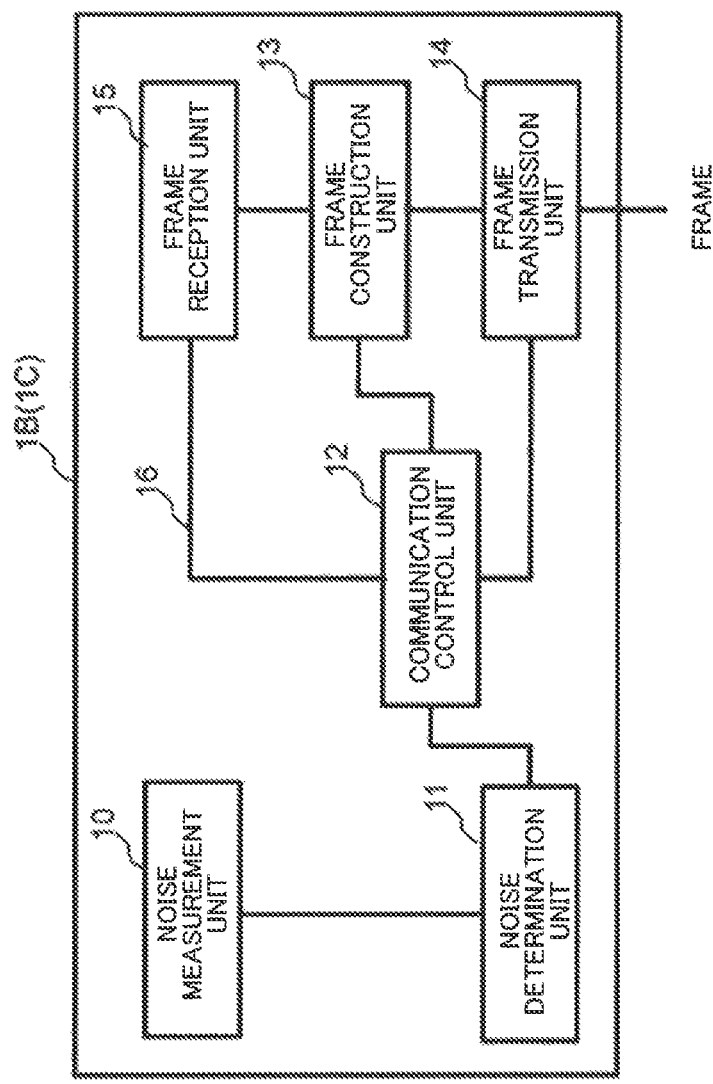
FIG. 7 is a diagram illustrating a configuration example of a wireless communication apparatus according to the third exemplary example embodiment of the present invention.

FIG. 7 illustrates a configuration example of the wireless communication apparatus 1B (1C) according to the third exemplary example embodiment. Referring to FIG. 7, the wireless communication apparatus 1B (1C) includes a frame reception unit 15 connected to a communication control unit 12 through a signal line 16.

According to the third exemplary example embodiment, the two wireless communication apparatuses 1B and 1C mutually notify a noise generation time point and a noise generation time interval, and perform communication in a time interval in which noise is not generated on both the transmission and reception sides.

The communication control unit 12 in the wireless communication apparatus 1B (terminal) may generate a list (noise list) including a correspondence between a noise generation time point and a noise generation time interval in a predetermined time section from the present (present time point) as an entry. In the example in FIG. 3, a noise list is composed of ([t1, Nt], [t2, Nt], [t3, Nt], . . . ).

In the wireless communication apparatus 1B (terminal), the communication control unit 12 may pass the generated noise list to a frame construction unit 13.

In the wireless communication apparatus 1B (terminal), the frame construction unit 13 generates a frame for transmitting a noise list passed from the communication control unit 12 and pass the frame to a frame transmission unit 14.

In the wireless communication apparatus 1B (terminal), in order to indicate that data in a transmitted frame represent a communication schedule, the frame transmission unit 14 may set a predetermined value to a header part of the frame or a specific field in the data, the predetermined value indicating that transmission data represent a communication schedule. For example, a predetermined value indicating that transmission data represent a communication schedule may be set to a reservation bit or the like in the header of a frame.

In the wireless communication apparatus 1B (terminal), the frame transmission unit 14 transmits a frame passed from the frame construction unit 13 to the wireless network.

A frame transmitted from the wireless communication apparatus 1B (terminal) is received by the frame reception unit 15 in the wireless communication apparatus 1C (AP).

In the wireless communication apparatus 1C (AP), when detecting that a value indicating a notification of a noise list is set to a received frame, the frame reception unit 15 passes the noise list to the communication control unit 12 through the signal line 16.

The communication control unit 12 in the wireless communication apparatus 1C (AP) reflects information in a received noise list of the wireless communication apparatus 1B (terminal) in the noise list of the wireless communication apparatus 1C (AP). The above can be acquired by, for example, sorting entries described in one another's noise lists, based on noise generation time points.

The communication control unit 12 in the wireless communication apparatus 1C (AP) determines a communication-enabled time interval and a communication start time point by use of a noise list (combined noise list) acquired by reflecting noise in the wireless communication apparatus 1B (terminal). Then, the communication control unit 12 generates a communication schedule having a pair of the communication start time point and the communication-enabled time interval as an entry.

At this time, the communication control unit 12 in the wireless communication apparatus 1C (AP) may be configured to take into account the time required for a radio wave to propagate through space, by correcting a communication start time and a communication-enabled time interval based on a distance between the wireless communication apparatuses 1B and 1C. For example, a correction value may be determined by a method of determining a distance, based on positional information by the GPS, and setting the time required for light to propagate through the distance as the time required for a radio wave to propagate through space.

The wireless communication apparatus 1C (AP) converts a communication schedule generated by the communication control unit 12 into a frame by the frame construction unit 13 and transmits the frame to the wireless communication apparatus 1A (terminal) by the frame transmission unit 14. At this time, a value indicating a notification of a communication schedule may be set to a specific field in the frame or the header.

In the wireless communication apparatus 1B (terminal), the frame reception unit 15 receives a frame transmitted from the wireless communication apparatus 1C (AP). When detecting, in the frame, a value indicating a notification of a communication schedule from the wireless communication apparatus 1C (AP), the frame reception unit 15 passes the communication schedule to the communication control unit 12.

The communication control unit 12 in the wireless communication apparatus 1B (terminal) transmits a frame, in accordance with a received communication schedule.

Times of the wireless communication apparatus 1C (AP) and the wireless communication apparatus 1B (terminal) are synchronized by, for example, a means such as the GPS. Accordingly, a communication start time point and a communication-enabled time interval defined in a communication schedule can be generated at the two wireless communication apparatuses 1B and 1C at the same timing.

An entry in a communication schedule is consumed one by one every time a frame is transmitted or a frame is received. When all entries are consumed, a communication schedule is newly generated at the wireless communication apparatus 1C (AP).

Further, a communication schedule may be generated when a change in a radio wave environment around the wireless communication apparatus 1B or 1C is detected by the noise determination unit 11 in either the wireless communication apparatus 1B or 1C.

When the wireless communication apparatus 1C (AP) receives a noise list in a state that an entry remains in a communication schedule, the wireless communication apparatus 1C (AP) may discard the communication schedule up to that time and generate a new communication schedule.

Alternatively, the wireless communication apparatus 1B (terminal) may pass an expected value and a probability distribution of noise generation times to the wireless communication apparatus 1C (AP). In this case, the wireless communication apparatus 1C (AP) may also determine an expected value and a probability distribution of noise generation times. Then, the wireless communication apparatus 1C (AP) generate an expected value and a probability distribution of the noise generation times combining the expected value and the probability distribution of the noise generation times in the wireless communication apparatus 1C (AP) with those in the wireless communication apparatus 1B (terminal). After that, the wireless communication apparatus 1C (AP) may notify the generated expected value and probability distribution to the wireless communication apparatus 1B (terminal), and the wireless communication apparatus 1B (terminal) may generate and transmit a frame, based on the information.

The third exemplary example embodiment calculates a communication start time point and a communication-enabled time interval, based on radio wave status (noise information) of wireless communication apparatuses on both the transmission and reception sides. Consequently, communication can be performed avoiding a noise generation time interval, at the wireless communication apparatuses on both the transmission and reception sides.

Modified Example 1

When the frame construction unit 13 determines a frame size, a time interval until an ACKnowledgement (ACK) from a communication counterpart is returned may be included in the communication-enabled time interval.

For example, a transmission rate used for an ACK is defined by the IEEE 802.11a standard. Further, a size of an ACK frame is also defined. Accordingly, a transmission time point (time) of an ACK can be calculated. Further, in order to more accurately include return of an ACK in a communication-enabled time interval, a propagation delay of a radio wave based on a distance between the wireless communication apparatuses may be taken into account.

Modified Example 2

When a communication-enabled time interval includes not only data transmission but also a series of sequences related to communication, such as reception of an ACK, the communication sequence may be shortened according to the communication-enabled time interval, in order to transmit as much data as possible.

For example, in IEEE 802.11, a communication sequence may be shortened by:
(a) zeroing a backoff period for determining that a wireless network is idle and
(b) using a short inter frame space (SIFS) instead of a distributed coordination function IFS (DIFS) as an IFS, even in a data communication other than an ACK.

When a channel is determined to be unused by carrier sensing, data is not immediately transmitted according to the communication procedure CSMA/CA adopted in IEEE 802.11. In this procedure, due to the avoidance of collision, carrier sensing is performed after standing by for a random time (backoff time), and an idle state in the channel is confirmed after standing by for the backoff time, and then, data is transmitted. However, in a case that the backoff time is zeroed by the item (a) described above, when a channel is determined to be unused by carrier sensing, the data are immediately transmitted.

Further, an SIFS being relatively short is assigned to an ACK as an IFS being a standby period until a channel becomes idle from busy and a next frame is transmitted. Thus, there is no backoff time. A data frame is assigned with a DIFS being relatively long, whereas a data frame is assigned with an SIFS by the item (b) described above.

Modified Example 3

When a plurality of wireless communication apparatuses 1B (terminal) and one wireless communication apparatus 1C (AP) exist in FIG. 6, the wireless communication apparatus 1C (AP) may be configured to generate a communication schedule for each wireless communication apparatus 1B (terminal) in such a way that there is always one wireless communication apparatus 1B (terminal) communicating with the wireless communication apparatus 1C (AP), based on a noise list (a list having a pair of a generation time point of noise and a generation time interval of the noise as an entry) of every wireless communication apparatus 1B (terminal) and a noise list of the wireless communication apparatus 1C (AP) itself.

Specifically, it is assumed that noise originally does not exist in a certain wireless communication apparatus 1B (terminal), and therefore communication with the wireless communication apparatus 1C (AP) is possible. In this case, in a time span in which the wireless communication apparatus 1C (AP) communicates with another wireless communication apparatus 1B (terminal), the wireless communication apparatus 1C (AP) generates a communication schedule indicating as though noise exists in the certain wireless communication apparatus 1B (terminal) and communication with the wireless communication apparatus 1C (AP) cannot be performed (virtually setting the time span to a noise generation time interval). Consequently, a wireless communication system in which arbitration between the wireless communication apparatus 1C (AP) and a plurality of wireless communication apparatuses 1B (terminal) is performed can be provided.

Alternatively, the wireless communication apparatus 1C (AP) may generate an expected value and a probability distribution of noise generation times, the expected value and the probability distribution respectively combining an expected value and a probability distribution of noise generation times in a plurality of wireless communication apparatuses 1B (terminal) with an expected value and a probability distribution of noise generation times in the wireless communication apparatus 1C (AP), and notify the generated expected value and probability distribution to each wireless communication apparatus 1B (terminal).

Consequently, an effect of reducing a probability of communications between the wireless communication apparatuses 1B (terminal) communicating with the wireless communication apparatus 1C (AP) interfering with one another is expected.

Figure 9:
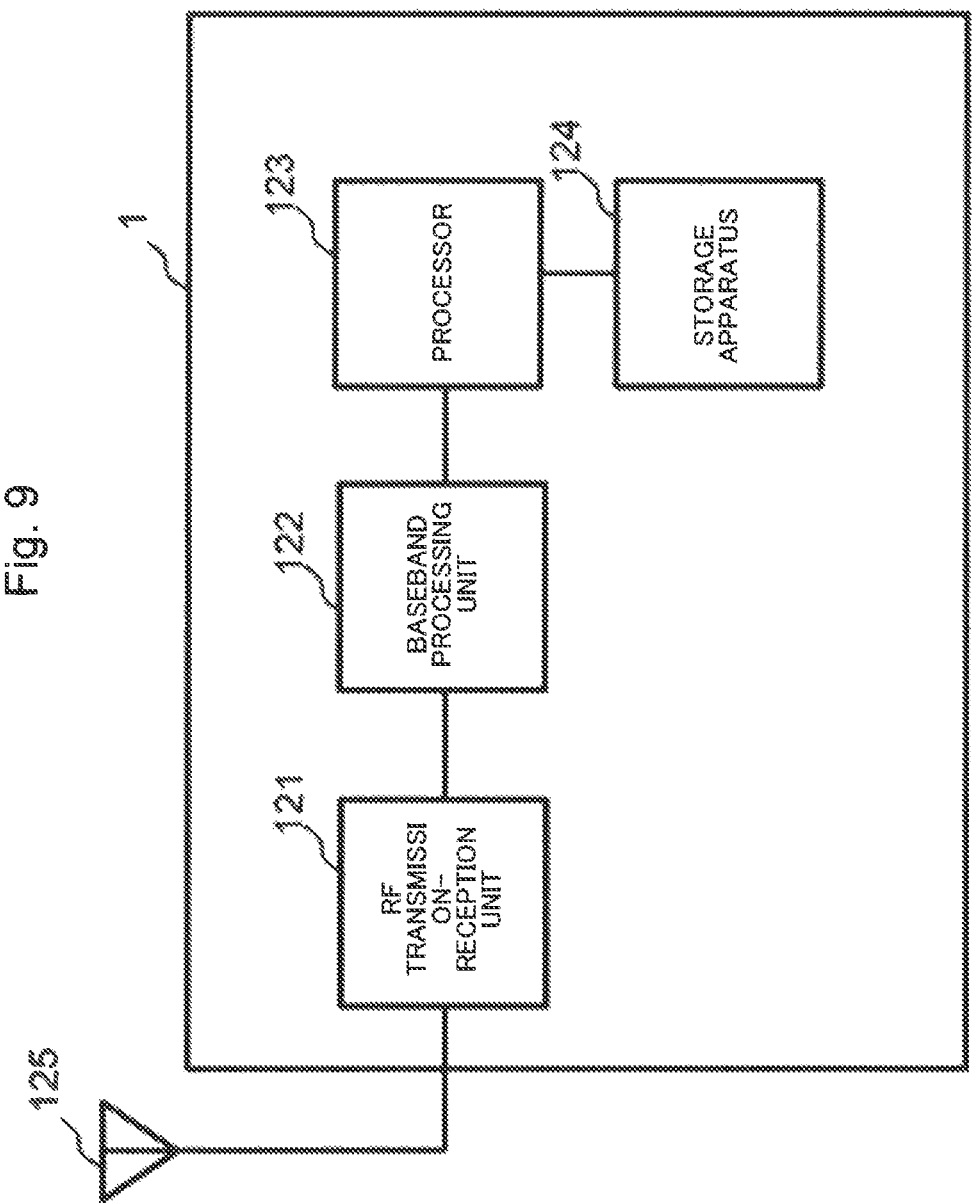
FIG. 9 is a diagram illustrating an example embodiment of the present invention.

Processing in each unit in the wireless communication apparatuses (including the terminal or the AP in FIG. 6) according to the exemplary example embodiments described above may be executed by a program executed by a computer (processor). FIG. 9 is a diagram illustrating a configuration provided by a computer. Referring to FIG. 9, a wireless communication apparatus 1 includes a radio frequency (RF) transmission-reception unit 121, a baseband processing unit 122, a processor 123, and a storage apparatus 124. The storage apparatus 124 is configured with one of or a combination of more than one of a hard disk drive (HDD), a semiconductor memory (for example, a solid state drive [SSD], a dynamic random access memory [DRAM], a static random access memory [SRAM], a read-only memory [ROM], and an electrically erasable and programmable read-only memory), a compact disk (CD), a digital versatile disk (DVD), and the like, and stores a program executed by the processor 123. By executing the program stored in the storage apparatus 124, the processor 123 provides, at least in part or in whole, a processing function of each unit in, for example, the wireless communication apparatus in FIG. 1A or 1B, or the wireless communication apparatuses according to the exemplary example embodiments. A transmission unit in the RF transmission-reception unit 121 converts a signal from the baseband processing unit 122 into an analog signal, frequency-converts the analog signal into an RF signal by orthogonal modulation with a local oscillation signal from an unillustrated local oscillator, power-amplifies the RF signal by an unillustrated power amplifier, and transmits the amplified signal from an antenna 125 as a radio wave. A reception part in the RF transmission-reception unit 121 low-noise amplifies an RF signal received by the antenna 125, frequency-converts the amplified signal into an intermediate frequency by orthogonal modulation with a local oscillation signal, converts the intermediate frequency signal into a digital signal, and provide the digital signal for the baseband processing unit 122. For example, the baseband processing unit 122 may perform processing such as OFDM subcarrier modulation and demodulation, and an IFFT and an FFT.

The first to third exemplary example embodiments and the modified examples that are described above are applicable to a purpose of performing wireless communication between pieces of equipment in a space where an apparatus generating noise shorter than the frame transmission time required for normal wireless communication exists, such as a plant.

Furthermore, each disclosure of aforementioned PTLs 1 to 8 and NPL 1 is incorporated herein by reference thereto. The example embodiments or the modified examples may be changed and adjusted within the scope of the entire disclosure (including the claims) of the present invention, and on the basis of the basic technological concept thereof. Further, within the scope of the claims of the present invention, various disclosed elements (including the respective elements of the claims, the respective elements of the examples, and the respective elements of the drawings) may be combined and selected in a variety of ways. That is to say, it is apparent that the present invention includes various modifications and changes that may be made by a person skilled in the art, on the basis of the entire disclosure including the claims, and the technological concept.

The whole or part of the example embodiments disclosed above can be described as, but not limited to, the following supplementary notes.

(Supplementary Note 1)

A wireless communication apparatus comprising:

a noise determination unit configured to determine noise generation information in a predetermined time range, based on a measurement result of noise;

a communication control unit configured to determine a first time interval in which the noise can be avoided and communication can be performed, based on the noise generation information;

a construction unit configured to determine a size of a data transmission unit whose communication can be completed within the first time interval, and construct the data transmission unit by storing data in the data transmission unit with the size; and a transmission unit configured to transmit the data transmission unit within the first time interval.

(Supplementary Note 2)

The wireless communication apparatus according to Supplementary Note 1, wherein, based on the measurement result of the noise by a noise measurement unit configured to measure the noise related to a frequency band used in communication, the noise determination unit determines at least a time point when the noise is generated and a time interval from generation to termination of the noise, as the noise generation information.

(Supplementary Note 3)

The wireless communication apparatus according to Supplementary Note 2 or 3, wherein the communication control unit determines the first time interval, based on a first time point when the noise is generated, a second time interval from generation to termination of the noise, and a second time point when next noise is generated, and notifies the construction unit of the first time interval.

(Supplementary Note 4)

The wireless communication apparatus according to Supplementary Note 3, wherein the communication control unit determines a communication start time point, based on the first time point and the second time interval, and notifies the transmission unit of the communication start time point, and the transmission unit transmits the data transmission unit at the communication start time point.

(Supplementary Note 5)

The wireless communication apparatus according to Supplementary Note 1 or 2, wherein, based on a probability that the noise is generated, the communication control unit sets a time interval in which noise is not generated during communication with a predetermined probability as the communication-enabled first time interval.

(Supplementary Note 6)

The wireless communication apparatus according to any one of Supplementary Notes 1 to 5, wherein, the construction unit calculates a size of a data transmission unit transmittable during the first time interval, based on a modulation technique to be used and a code amount of an error correction code.

(Supplementary Note 7)

The wireless communication apparatus according to any one of Supplementary Notes 1 to 6, wherein the construction unit calculates a size of a data transmission unit transmittable during the first time interval, based on a modulation technique and information indicating a code amount that are included in a reception signal.

(Supplementary Note 8)

The wireless communication apparatus according to any one of Supplementary Notes 1 to 6, wherein the construction unit calculates a size of a data transmission unit transmittable during the first time interval, based on information about a transmission speed, the information being included in a signal received from a communication counterpart.

(Supplementary Note 9)

The wireless communication apparatus according to any one of Supplementary Notes 1 to 8, wherein at least information about a time point when the noise is generated and a time interval from generation to termination of the noise is exchanged with another wireless communication apparatus, and a data transmission unit is transmitted to and received from the another wireless communication apparatus in the first time interval in which the noise is not generated.

(Supplementary Note 10)

The wireless communication apparatus according to any one of Supplementary Notes 1 to 8, wherein, when transmitting the data transmission unit, the transmission unit transmits a notification of transmission completion to the communication control unit, and, when receiving the notification of transmission completion from the transmission unit, the communication control unit notifies the transmission unit of a next communication start time point and notifies the construction unit of the next communication-enabled time interval.

(Supplementary Note 11)

The wireless communication apparatus according to any one of Supplementary Notes 1 to 8, wherein the communication control unit notifies the transmission unit of communication start time points of a predetermined number of communications and notifies the construction unit of a predetermined number of communication-enabled time intervals.

(Supplementary Note 12)

The wireless communication apparatus according to Supplementary Note 11, wherein, when receiving, from the construction unit, a notification that a frame is not transmitted, the transmission unit does not transmit a data transmission unit at the communication start time point.

(Supplementary Note 13)

The wireless communication apparatus according to any one of Supplementary Notes 1 to 8, wherein, when the construction unit determines a size of the data transmission unit transmittable in the communication-enabled time interval, a time interval until an acknowledgement from a communication counterpart is returned is included in the communication-enabled time interval.

(Supplementary Note 14)

The wireless communication apparatus according to Supplementary Note 13, wherein a waiting time until transmission is made to zero or shortened.

(Supplementary Note 15)

The wireless communication apparatus according to Supplementary Note 9, wherein, in a time span in which the wireless communication apparatus communicates with a first wireless communication apparatus, information that noise exists and communication with the wireless communication apparatus cannot be performed is transmitted to a second wireless communication apparatus.

(Supplementary Note 16)

The wireless communication apparatus according to Supplementary Note 9, wherein the wireless communication apparatus generates an expected value and a probability of a time when noise is generated, the expected value and the probability respectively combining an expected value and a probability of a time when noise is generated in another wireless communication apparatus with an expected value and a probability of a time when noise is generated in the wireless communication apparatus, and notifies the another wireless communication apparatus of the generated expected value and probability.

(Supplementary Note 17)

A wireless communication method by a wireless communication apparatus, the wireless communication method comprising:

determining noise generation information in a predetermined time range, based on a measurement result of noise;

determining a first time interval in which the noise is not generated, as a time interval in which communication can be performed, based on the noise generation information;

determining a size of a data transmission unit transmittable within the first time interval and constructing a data transmission unit with the size storing transmission data; and transmitting the data transmission unit from a transmission unit within the first time interval.

(Supplementary Note 18)

The wireless communication method according to Supplementary Note 17, further comprising:

measuring noise related to a frequency band used in wireless communication; and determining at least a time point when the noise is generated and a time interval from generation to termination of the noise, based on a measurement result of the noise.

(Supplementary Note 19)

The wireless communication method according to Supplementary Note 17 or 18, further comprising determining the first time interval, based on a first time point when the noise is generated, a second time interval from generation to termination of the noise, and a second time point when next noise is generated, and notifying a construction unit of the first time interval.

(Supplementary Note 20)

The wireless communication method according to Supplementary Note 19, further comprising determining a communication start time point, based on the first time point and the second time interval, and notifying the transmission unit of the communication start time point, wherein the transmission unit transmits the data transmission unit at the communication start time point.

(Supplementary Note 21)

The wireless communication method according to Supplementary Note 17 or 18, further comprising, based on a probability that the noise is generated, setting a time interval in which noise is not generated during communication with a predetermined probability as the communication-enabled first time interval.

(Supplementary Note 22)

The wireless communication method according to any one of Supplementary Notes 17 to 21, further comprising calculating a size of a data transmission unit transmittable during the first time interval, based on a modulation technique to be used and a code amount of an error correction code.

(Supplementary Note 23)

The wireless communication method according to any one of Supplementary Notes 17 to 22, further comprising calculating a size of a data transmission unit transmittable during the first time interval, based on a modulation technique and information indicating a code amount that are included in a reception signal.

(Supplementary Note 24)

The wireless communication method according to any one of Supplementary Notes 17 to 23, further comprising calculating a size of a data transmission unit transmittable during the first time interval, based on information about a transmission speed, the information being included in a signal received from a communication counterpart.

(Supplementary Note 25)

The wireless communication method according to any one of Supplementary Notes 17 to 24, further comprising:

exchanging, with another wireless communication apparatus, at least information about a time point when the noise is generated and a time interval from generation to termination of the noise; and transmitting and receiving the data transmission unit to and from the another wireless communication apparatus in the first time interval in which the noise is not generated.

(Supplementary Note 26)

The wireless communication method according to any one of Supplementary Notes 17 to 24, further comprising:

when transmitting the data transmission unit by the transmission unit, transmitting a notification of transmission completion; and, when receiving the notification of transmission completion, notifying the transmission unit of a next communication start time point and notifying the construction unit of the next communication-enabled time interval.

(Supplementary Note 27)

The wireless communication method according to any one of Supplementary Notes 17 to 24, further comprising notifying the transmission unit of communication start time points of a predetermined number of communications and notifying of a predetermined number of communication-enabled time intervals.

(Supplementary Note 28)

The wireless communication method according to Supplementary Note 27, further comprising, when receiving a notification that the transmission unit does not transmit a frame, not transmitting the data transmission unit at the communication start time point.

(Supplementary Note 29)

The wireless communication method according to any one of Supplementary Notes 17 to 24, further comprising, when determining a size of the data transmission unit transmittable during the communication-enabled time interval, including, in the communication-enabled time interval, a time interval until an acknowledgement from a communication counterpart is returned.

(Supplementary Note 30)

The wireless communication method according to Supplementary Note 29, further comprising making to zero or shortening a waiting time until transmission.

(Supplementary Note 31)

The wireless communication method according to Supplementary Note 25, further comprising, in a time span in which the wireless communication apparatus communicates with a first wireless communication apparatus, transmitting information, to a second wireless communication apparatus, that noise exists and communication with the wireless communication apparatus cannot be performed.

(Supplementary Note 32)

The wireless communication method according to Supplementary Note 25, further comprising generating, by the wireless communication apparatus, an expected value and a probability of a time when noise is generated, the expected value and the probability respectively combining an expected value and a probability of a time when noise is generated in another wireless communication apparatus with an expected value and a probability of a time when noise is generated in the wireless communication apparatus, and notifying, by the wireless communication apparatus, the another wireless communication apparatus of the generated expected value and probability.

(Supplementary Note 33)

A program causing a computer constituting a wireless communication apparatus to execute:

processing of determining noise generation information in a predetermined time range, based on a measurement result of noise;

communication control processing of determining a first time interval in which the noise is not generated, as a time interval in which communication can be performed, based on the noise generation information;

construction processing of determining a size of a data transmission unit transmittable within the first time interval and constructing a data transmission unit with the size storing transmission data; and transmission processing of transmitting the data transmission unit within the first time interval.

(Supplementary Note 34)

The program according to Supplementary Note 33, further comprising:

processing of measuring noise related to a frequency band used in wireless communication; and processing of determining at least a time point when the noise is generated and a time interval from generation to termination of the noise, based on a measurement result of the noise.

(Supplementary Note 35)

The program according to Supplementary Note 33 or 34, wherein the communication control processing determines the first time interval, based on a first time point when the noise is generated, a second time interval from generation to termination of the noise, and a second time point when next noise is generated, and notifies a construction unit of the first time interval.

(Supplementary Note 36)

The program according to Supplementary Note 35, wherein the communication control processing determines a communication start time point, based on the first time point and the second time interval, and notifies a transmission unit of the communication start time point, and the transmission unit transmits the data transmission unit at the communication start time point.

(Supplementary Note 37)

The program according to Supplementary Note 33 or 34, wherein, based on a probability that the noise is generated, the communication control processing sets a time interval in which noise is not generated during communication with a predetermined probability as the communication-enabled first time interval.

(Supplementary Note 38)

The program according to any one of Supplementary Notes 33 to 37, wherein the construction processing calculates a size of a data transmission unit transmittable during the first time interval, based on a modulation technique to be used and a code amount of an error correction code.

(Supplementary Note 39)

The program according to any one of Supplementary Notes 33 to 37, wherein the construction processing calculates a size of a data transmission unit transmittable during the first time interval, based on a modulation technique and information indicating a code amount that are included in a reception signal.

(Supplementary Note 40)

The program according to any one of Supplementary Notes 33 to 37, wherein the construction processing calculates a size of a data transmission unit transmittable during the first time interval, based on information about a transmission speed, the information being included in a signal received from a communication counterpart.

(Supplementary Note 41)

The program according to any one of Supplementary Notes 33 to 40, the program further comprising:

processing of exchanging, with another wireless communication apparatus, at least information about a time point when the noise is generated and a time interval from generation to termination of the noise; and processing of transmitting and receiving the data transmission unit to and from the another wireless communication apparatus in the first time interval in which the noise is not generated.

(Supplementary Note 42)

The program according to any one of Supplementary Notes 33 to 40, wherein, when transmitting the data transmission unit, the transmission processing transmits a notification of transmission completion to the communication control processing, and, when receiving the notification of transmission completion, the communication control processing notifies the transmission processing of a next communication start time point and notifies the construction processing of the next communication-enabled time interval.

(Supplementary Note 43)

The program according to any one of Supplementary Notes 33 to 40, wherein the communication control processing notifies the transmission processing of communication start time points of a predetermined number of communications and notifies the construction processing of a predetermined number of communication-enabled time intervals.

(Supplementary Note 44)

The program according to Supplementary Note 43, wherein, when receiving, from the construction processing, a notification that a frame is not transmitted, the transmission unit does not transmit the data transmission unit at the communication start time point.

(Supplementary Note 45)

The program according to any one of Supplementary Notes 33 to 40, wherein, when the construction processing determines a size of the data transmission unit transmittable in the communication-enabled time interval, a time interval until an acknowledgement from a communication counterpart is returned is included in the communication-enabled time interval.

(Supplementary Note 46)

The program according to Supplementary Note 45, wherein a waiting time until transmission is made to zero or shortened.

(Supplementary Note 47)

The program according to Supplementary Note 41, wherein, in a time span in which the wireless communication apparatus communicates with a first wireless communication apparatus, the wireless communication apparatus executes processing of transmitting, to a second wireless communication apparatus, information that noise exists and communication with the wireless communication apparatus cannot be performed.

(Supplementary Note 48)

The program according to Supplementary Note 41, wherein the wireless communication apparatus executes processing of generating an expected value and a probability of a time when noise is generated, the expected value and the probability respectively combining an expected value and a probability of a time when noise is generated in another wireless communication apparatus with an expected value and a probability of a time when noise is generated in the wireless communication apparatus, and notifying the another wireless communication apparatus the generated expected value and probability.

(Supplementary Note 49)

A wireless communication system comprising at least a first wireless communication apparatus and a second wireless communication apparatus that communicate with one another through a wireless network, wherein at least one of the first wireless communication apparatus and the second wireless communication apparatus includes:

first means that determines a noise generation interval, based on a measurement result of noise; and second means that determines a size of the data transmission unit transmittable in the noise generation interval, and constructs and transmits a data transmission unit with the size.

(Supplementary Note 50)

The wireless communication system according to Supplementary Note 49, wherein the first means includes:

a noise determination unit configured to determine noise generation information in a predetermined time range, based on a measurement result of noise; and a communication control unit configured to determine, based on the noise generation information, a first time interval in which the noise can be avoided and communication can be performed, and the second means includes:

a construction unit configured to determine a size of a data transmission unit whose communication can be completed within the first time interval and construct the data transmission unit by storing data in the data transmission unit with the size; and a transmission unit configured to transmit the data transmission unit within the first time interval.

(Supplementary Note 51)

The wireless communication system according to Supplementary Note 50, wherein the first means includes a noise measurement unit configured to measure noise related to a frequency band used in communication, and, based on a measurement result of the noise by the noise measurement unit, the noise determination unit determines at least a time point when the noise is generated and a time interval from generation to termination of the noise, as the noise generation information.

(Supplementary Note 52)

The wireless communication system according to Supplementary Note 50 or 51, wherein the communication control unit determines the first time interval, based on a first time point when the noise is generated, a second time interval from generation to termination of the noise, and a second time point when next noise is generated, and notifies the construction unit of the first time interval.

(Supplementary Note 53)

The wireless communication system according to Supplementary Note 52, wherein the communication control unit determines a communication start time point, based on the first time point and the second time interval, and notifies the transmission unit of the communication start time point, and the transmission unit transmits the data transmission unit at the communication start time point.

(Supplementary Note 54)

The wireless communication system according to Supplementary Note 50 or 51, wherein, based on a probability that the noise is generated, the communication control unit sets a time interval in which noise is not generated during communication with a predetermined probability as the communication-enabled first time interval.

(Supplementary Note 55)

The wireless communication system according to any one of Supplementary Notes 50 to 54, wherein the construction unit calculates a size of a data transmission unit transmittable during the first time interval, based on a modulation technique to be used and a code amount of an error correction code.

(Supplementary Note 56)

The wireless communication system according to any one of Supplementary Notes 50 to 55, wherein the construction unit calculates a size of a data transmission unit transmittable during the first time interval, based on a modulation technique and information indicating a code amount that are included in a reception signal.

(Supplementary Note 57)

The wireless communication system according to any one of Supplementary Notes 50 to 55, wherein the construction unit calculates a size of a data transmission unit transmittable during the first time interval, based on information about a transmission speed, the information being included in a signal received from a communication counterpart.

(Supplementary Note 58)

The wireless communication system according to any one of Supplementary Notes 50 to 57, wherein one of the first and the second wireless communication apparatuses exchanges, with the other of the first and the second wireless communication apparatuses, at least information about a time point when the noise is generated and a time interval from generation to termination of the noise, and the data transmission unit is transmitted to and received from the other wireless communication apparatus in the first time interval in which the noise is not generated.

(Supplementary Note 59)

The wireless communication system according to any one of Supplementary Notes 50 to 57, wherein, when transmitting the data transmission unit, the transmission unit transmits a notification of transmission completion to the communication control means, and, when receiving the notification of transmission completion from the transmission unit, the communication control unit notifies the transmission unit of a next communication start time point and notifies the construction unit of the next communication-enabled time interval.

(Supplementary Note 60)

The wireless communication system according to any one of Supplementary Notes 50 to 57, wherein the communication control unit notifies the transmission means of communication start time points of a predetermined number of communications and notifies the construction unit of a predetermined number of communication-enabled time intervals.

(Supplementary Note 61)

The wireless communication system according to Supplementary Note 60, wherein, when receiving, from the construction unit, a notification that a frame is not transmitted, the transmission unit responds to the communication control unit without transmitting the data transmission unit at the communication start time point.

(Supplementary Note 62)

The wireless communication system according to any one of Supplementary Notes 50 to 57, wherein, when the construction unit determines a size of the data transmission unit transmittable within the communication-enabled time interval, a time interval until an acknowledgement from a communication counterpart is returned is included in the communication-enabled time interval.

(Supplementary Note 63)

The wireless communication system according to Supplementary Note 62, wherein a waiting time until transmission is made to zero or shortened.

(Supplementary Note 64)

The wireless communication system according to Supplementary Note 58, wherein, one of the first and the second wireless communication apparatuses transmits, to another wireless communication apparatus, information that noise exists and communication cannot be performed, in a time span in which communication is performed with the other wireless communication apparatus.

(Supplementary Note 65)

The wireless communication system according to Supplementary Note 58, wherein one of the first and the second wireless communication apparatuses generates an expected value and a probability of a time when noise is generated, the expected value and the probability respectively combining an expected value and a probability of a time when noise is generated in the other wireless communication apparatus with an expected value and a probability of a time when noise is generated in the one of the first and the second wireless communication appara-tuses, and notifies the another wireless communication apparatus of the generated expected value and probability.

(Supplementary Note 66)

A wireless communication apparatus comprising:

first means that determines a noise generation interval, based on a noise measurement result; and second means that determines a size of a data transmission unit transmittable within the noise generation interval, and constructs and transmits a data transmission unit with the size.

(Supplementary Note 67)

The wireless communication apparatus according to Supplementary Note 66, wherein the first means includes:

a noise determination unit configured to determine noise generation information in a predetermined time range, based on a noise measurement result; and a communication control unit configured to determine a first time interval in which noise can be avoided and communication can be performed, based on the noise generation information, and the second means includes:

a construction unit configured to determine a size of the data transmission unit whose communication can be completed within the first time interval, and construct the data transmission unit by storing data within the data transmission unit with the size; and a transmission unit configured to transmit the data transmission unit in the first time interval.

(Supplementary Note 68)

The wireless communication apparatus according to Supplementary Note 67, wherein, based on the noise measurement result by a noise measurement unit configured to measure the noise related to a frequency band used in communication, the noise determination unit determines a time when the noise is generated and a time interval from generation to termination of the noise, as the noise generation information.

(Supplementary Note 69)

The wireless communication apparatus according to Supplementary Note 67 or 68, wherein the communication control unit determines the first time interval, based on a first time when the noise is generated, a second time interval from generation to termination of the noise, and a second time when next noise is generated, and notifies the construction unit of the first interval.

(Supplementary Note 70)

The wireless communication apparatus according to any one of Supplementary Notes 67 to 69, wherein the communication control unit determines a communication start time, based on a first time when the noise is generated and a second time interval from generation to termination of the noise, and notifies the transmission unit of the communication start time, and the transmission unit transmits the data transmission unit at the communication start time.

(Supplementary Note 71)

The wireless communication apparatus according to Supplementary Note 67 or 68, wherein, based on a probability that the noise is generated, the communication control unit sets a time interval in which noise is not generated during communication with a predetermined probability as the communication-enabled first time interval.

(Supplementary Note 72)

The wireless communication apparatus according to any one of Supplementary Notes 67 to 71, wherein the construction unit calculates a size of the data transmission unit transmittable during the first time interval, based on a modulation technique and a code amount of an error correction code.

(Supplementary Note 73)

The wireless communication apparatus according to any one of Supplementary Notes 66 to 71, wherein at least information about a time when the noise is generated and a time interval from generation to termination of the noise is exchanged with another wireless communication apparatus, and the data transmission unit is transmitted to and received from the another wireless communication apparatus in the first time interval in which the noise is not generated.

(Supplementary Note 74)

A wireless communication method comprising:

determining a noise generation interval, based on a noise measurement result; and determining a size of a data transmission unit transmittable within the noise generation interval, and constructing and transmitting a data transmission unit with the size.

(Supplementary Note 75)

A program causing a computer to execute:

processing of determining a noise generation interval, based on a noise measurement result; and processing of determining a size of a data transmission unit transmittable within the noise generation interval, and constructing and transmitting a data transmission unit with the size.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 1, 1A, 1B, 1C, 100 Wireless communication apparatus
2 Wireless communication system
10 Noise measurement unit
11, 111 Noise determination unit
12, 112 Communication control unit
13 Frame construction unit
14 Frame transmission unit
15 Frame reception unit
16 Signal line
31 Communication-enabled time interval (first time interval)
32 Generation time interval of noise (noise generation time interval)
33 Generation time point of noise (noise generation time point)
34 Communication start time point
35 Generation interval of noise (noise generation interval)
41 Short preamble part
42 Long preamble part
43 SIGNAL part
441, 442 Data part
50 Control unit
51 Motor
101 First means
102 Second means
113 Construction unit
114 Transmission unit
121 RF transmission-reception unit
122 Baseband processing unit
123 Processor
124 Storage apparatus
125 Antenna
200 Apparatus on the transmission side
201, 213 S/P converter
202 Modulator (subchannel modulator)
203 Inverse fast Fourier transformer (IFFT)
204, 216 P/S converter
205 Guard interval (GI) insertion unit
206, 211 Antenna
210 Apparatus on the reception side
212 Guard interval (GI) deletion unit
214 Fast Fourier transformer (FFT)
215 Demodulator (subchannel demodulator)

The invention claimed is:

1. A wireless communication apparatus comprising:
at least one memory storing one or more instructions; and
a processor configured to execute the one or more instructions to implement:
a noise determination unit configured to determine noise generation information in a predetermined time range, based on a measurement result of noise;
a communication control unit configured to determine a first time interval in which the noise can be avoided and communication can be performed, based on the noise generation information;
a construction unit configured to determine a size of a unit of data transmission whose communication can be completed within the first time interval, and construct the unit of data transmission by storing data in the unit of data transmission with the size; and
a transmission unit configured to transmit the unit of data transmission within the first time interval,
wherein, based on a probability that the noise is generated, the communication control unit is further configured to set a time interval in which noise is not generated during communication with a predetermined probability as the communication-enabled first time interval.

2. The wireless communication apparatus according to claim 1, wherein,
based on the measurement result of the noise related to a frequency band used in communication, the noise determination unit is further configured to determine at least a time point when the noise is generated and a time interval from generation to termination of the noise, as the noise generation information.

3. The wireless communication apparatus according to claim 1, wherein
the communication control unit is further configured to determine the first time interval, based on a first time point when the noise is generated, a second time interval from generation to termination of the noise, and a second time point when next noise is generated.

4. The wireless communication apparatus according to claim 3, wherein
the communication control unit is further configured to determine a communication start time point, based on the first time point and the second time interval, and notifies the transmission unit of the communication start time point, and
the transmission unit is further configured to transmit the unit of data transmission at the communication start time point.

5. The wireless communication apparatus according to claim 1, wherein,
the construction unit is further configured to calculate a size of a data transmission unit transmittable during the first time interval, based on a modulation technique to be used and a code amount of an error correction code.

6. The wireless communication apparatus according to claim 1, wherein
the construction unit is further configured to calculate the size of the unit of data transmission transmittable during the first time interval, based on a modulation technique and information indicating a code amount that are included in a reception signal.

7. The wireless communication apparatus according to claim 1, wherein
the construction unit is further configured to calculate the size of the unit of data transmission transmittable during the first time interval, based on information about a transmission speed, the information being included in a signal received from a communication counterpart.

8. The wireless communication apparatus according to claim 1, wherein
at least information about a time point when the noise is generated and a time interval from generation to termination of the noise is exchanged with another wireless communication apparatus, and
the unit of data transmission is transmitted to and received from the another wireless communication apparatus in the first time interval in which the noise is not generated.

9. The wireless communication apparatus according to claim 8, wherein,
in a time span in which the wireless communication apparatus communicates with a first wireless communication apparatus, information that noise exists and communication with the wireless communication apparatus cannot be performed is transmitted to a second wireless communication apparatus.

10. The wireless communication apparatus according to claim 8, wherein
the wireless communication apparatus generates an expected value and a probability of a time when noise is generated, the expected value and the probability respectively combining an expected value and a probability of a time when noise is generated in another wireless communication apparatus with an expected value and a probability of a time when noise is generated in the wireless communication apparatus, and notifies the another wireless communication apparatus of the generated expected value and probability.

11. The wireless communication apparatus according to claim 1, wherein,
when transmitting the unit of data transmission, the transmission unit is further configured to transmit a notification of transmission completion to the communication control unit, and,
when receiving the notification of transmission completion from the transmission unit, the communication control unit is further configured to notify the transmission unit of a next communication start time point and notify the construction unit of the next communication-enabled time interval.

12. The wireless communication apparatus according to claim 1, wherein
the communication control unit is further configured to notify the transmission unit of communication start time points of a predetermined number of communications and notify the construction unit of a predetermined number of communication-enabled time intervals.

13. The wireless communication apparatus according to claim 12, wherein,
when receiving, from the construction unit, a notification that a frame is not transmitted, the transmission unit does not transmit a data transmission unit at the communication start time point.

14. The wireless communication apparatus according to claim 1, wherein,
when the construction unit determines a size of the data transmission unit transmittable in the communication-enabled time interval, a time interval until an acknowledgement from a communication counterpart is returned is included in the communication-enabled time interval.

15. The wireless communication apparatus according to claim 14, wherein
a waiting time until transmission is made to zero or shortened.

16. A wireless communication method by a wireless communication apparatus, the wireless communication method comprising:
determining noise generation information in a predetermined time range, based on a measurement result of noise;
determining a first time interval in which the noise is not generated, as a time interval in which communication can be performed, based on the noise generation information;
determining a size of a unit of data transmission transmittable within the first time interval and constructing a data the unit of data transmission with the size storing transmission data;
transmitting the unit of data transmission from a transmission unit within the first time interval; and
setting, based on a probability that the noise is generated, a time interval in which noise is not generated during communication with a predetermined probability as the communication-enabled first time interval.

17. A non-transitory storage medium having a program stored therein, the program causing a computer constituting a wireless communication apparatus to execute:
processing of determining noise generation information in a predetermined time range, based on a measurement result of noise;
communication control processing of determining a first time interval in which the noise is not generated, as a time interval in which communication can be performed, based on the noise generation information;
construction processing of determining a size of a unit of data transmission transmittable within the first time interval and constructing the unit of data transmission with the size storing transmission data;
transmission processing of transmitting the unit of data transmission within the first time interval; and
setting, based on a probability that the noise is generated, a time interval in which noise is not generated during communication with a predetermined probability as the communication-enabled first time interval.

* * * * *

UNITED STATES PATENT AND TRADEMARK OFFICE
CERTIFICATE OF CORRECTION

PATENT NO. : 10,763,903 B2
APPLICATION NO. : 16/327598
DATED : September 1, 2020
INVENTOR(S) : Akira Tsuji and Kenichi Maruhashi It is certified that error appears in the above-identified patent and that said Letters Patent is hereby corrected as shown below:

In the Specification

Column 7, Advantageous Effects of Invention, Line 63; After "INVENTION", insert --¶The present invention enables stable communication even in an environment in which noise is generated.
        BRIEF DESCRIPTION OF DRAWINGS--

Column 16, Example of Embodiment, Line 20; Delete "(BPS K)," and insert --(BPSK),-- therefor Signed and Sealed this
First Day of December, 2020

Andrei Iancu
*Director of the United States Patent and Trademark Office*